(12) United States Patent
Sarathchandra et al.

(10) Patent No.: US 12,498,986 B2
(45) Date of Patent: Dec. 16, 2025

(54) METHODS, APPARATUS AND SYSTEMS FOR DECOMPOSING MOBILE APPLICATIONS INTO MICRO-SERVICES (MSS) AT RUNTIME FOR DISTRIBUTED EXECUTION

(71) Applicant: InterDigital Patent Holdings, Inc., Wilmington, DE (US)

(72) Inventors: Chathura Sarathchandra, London (GB); Dirk Trossen, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 748 days.

(21) Appl. No.: 17/767,815

(22) PCT Filed: Oct. 15, 2020

(86) PCT No.: PCT/US2020/055673
§ 371 (c)(1),
(2) Date: Apr. 8, 2022

(87) PCT Pub. No.: WO2021/076692
PCT Pub. Date: Apr. 22, 2021

(65) Prior Publication Data
US 2024/0086250 A1 Mar. 14, 2024

Related U.S. Application Data

(60) Provisional application No. 62/915,288, filed on Oct. 15, 2019.

(51) Int. Cl.
*G06F 9/50* (2006.01)
(52) U.S. Cl.
CPC ......... *G06F 9/5066* (2013.01); *G06F 9/5072* (2013.01); *G06F 2209/5017* (2013.01); *G06F 2209/509* (2013.01)

(58) Field of Classification Search
None
See application file for complete search history.

(56) References Cited

U.S. PATENT DOCUMENTS

| 10,198,250 B1 | 2/2019 | Sharma et al. |
| 2009/0313319 A1 | 12/2009 | Beisiegel et al. |

(Continued)

FOREIGN PATENT DOCUMENTS

| EP | 3508977 A1 | 7/2019 |
| WO | WO 2015195561 A1 | 12/2015 |

(Continued)

OTHER PUBLICATIONS

Wu et al., "An Efficient Application Partitioning Algorithm in Mobile Environments", IEEE Transactions on Parallel and Distributed Systems, vol. 30, No. 7, pp. 1464-1480. (Year: 2019).*

(Continued)

*Primary Examiner* — Qing Yuan Wu
(74) *Attorney, Agent, or Firm* — Majid Albassam

(57) ABSTRACT

Methods, apparatus and systems are disclosed. In one embodiment, a method implemented by an end user device to decompose an application at runtime includes collecting profile information regarding local executions of the application on the end user device and determining, by the end user device using the collected profile information, one or more microservice patterns to decompose a whole or a part of the application into at runtime. The method further includes partitioning, by the end user device at runtime, the application into: (1) a locally executed portion of the application to be executed by the end user device and (2) the determined microservice patterns to be locally executed by the end user device or remotely executed by an external entity in communication with the end user device.

17 Claims, 8 Drawing Sheets

(56) References Cited

U.S. PATENT DOCUMENTS

| | | |
|---|---|---|
| 2010/0318999 A1 | 12/2010 | Zhao et al. |
| 2018/0131764 A1 | 5/2018 | Suter et al. |
| 2019/0069322 A1 | 2/2019 | Davydov et al. |
| 2019/0108067 A1 | 4/2019 | Ishikawa et al. |

FOREIGN PATENT DOCUMENTS

| | | |
|---|---|---|
| WO | WO 2016123516 A1 | 8/2016 |
| WO | WO 2018197928 A1 | 11/2018 |
| WO | WO 2021016468 A1 | 1/2021 |

OTHER PUBLICATIONS

ZTE, "Summary of 7.2.1.1 Channel Structure for Two-step RACH", 3GPP Tdoc R1-1903435, 3GPP TSG RAN WG1 #96, Athens, Greece, Feb. 25-Mar. 1, 2019, 28 pages.

A. Balalaie and A. Heydarnoori, "Migration to a Cloud-Native", Architecture Enables DevOps, Architecture, IEEE Software, 33(3), 42-52, 11 pages, Sep. 13, 2019.

"Android Profiler", https://developer.android.com/studio/profile/android-profiler.

N. Dragoni et al., "Microservices: yesterday, today, and tomorrow", In Present and Ulterior Software Engineering, Springer, Cham. Sep. 13, 2019, 17 pages.

"Java ClassLoader", https://docs.oracle.com/javase/7/docs/api/java/lang/ClassLoader.html.

"Java Reflection API", https://docs.oracle.com/javase/tutorial/reflect/.

A. Hamou-Lhadj. "Techniques to Simplify the Analysis of Execution Traces for Program Comprehension", Ottawa- Carleton Institute for Computer Science, School of Information Technology and Engineering, University of Ottawa 2005, 171 pages.

"Python hotshot", https://docs.python.org/2/library/hotshot.html.

J. Chow et al., Decoupling dynamic program analysis from execution in virtual environments', USENIX 2008 Annual Technical Conference on Annual Technical Conference. 2008. 14 pages.

A. Doan et al., "Ontology Matching: A Machine Learning Approach", In: Staab S., Studer R. (eds) Handbook on Ontologies. International Handbooks on Information Systems. Springer, Berlin, Heidelberg, 20 pages.

"Java Virtual Machine Tool Interface" https://docs.oracle.com/javase/8/docs/technotes/guides/jvmti/.

"Open Knowledge Base Connectivity", http://www.ai.sri.com/~okbc/, 2 pages.

"Java Interface Instrumentation", https://docs.oracle.com/javase/7/docs/api/java/lang/instrument/Instrumentation.html.

\* cited by examiner

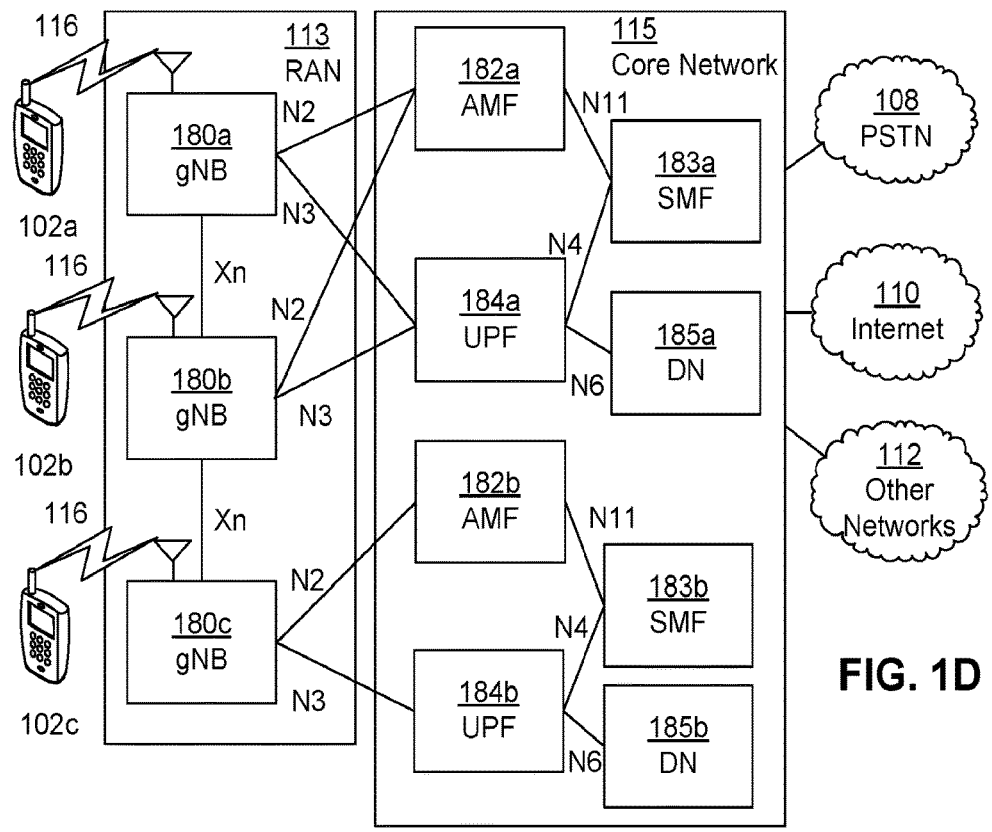
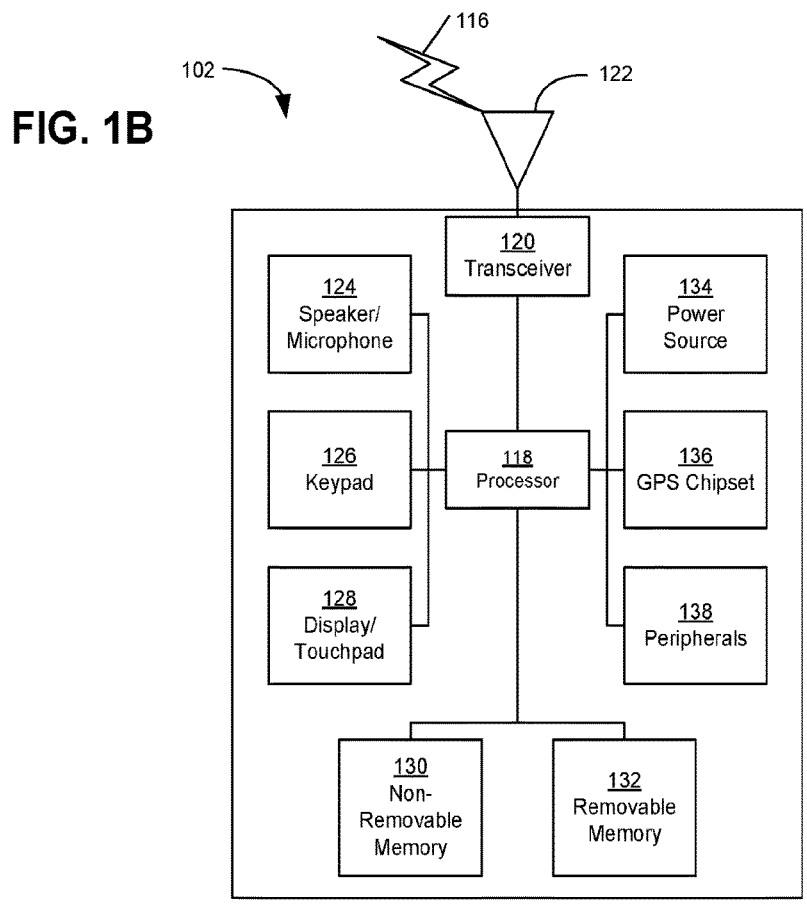
FIG. 1D
FIG. 1B

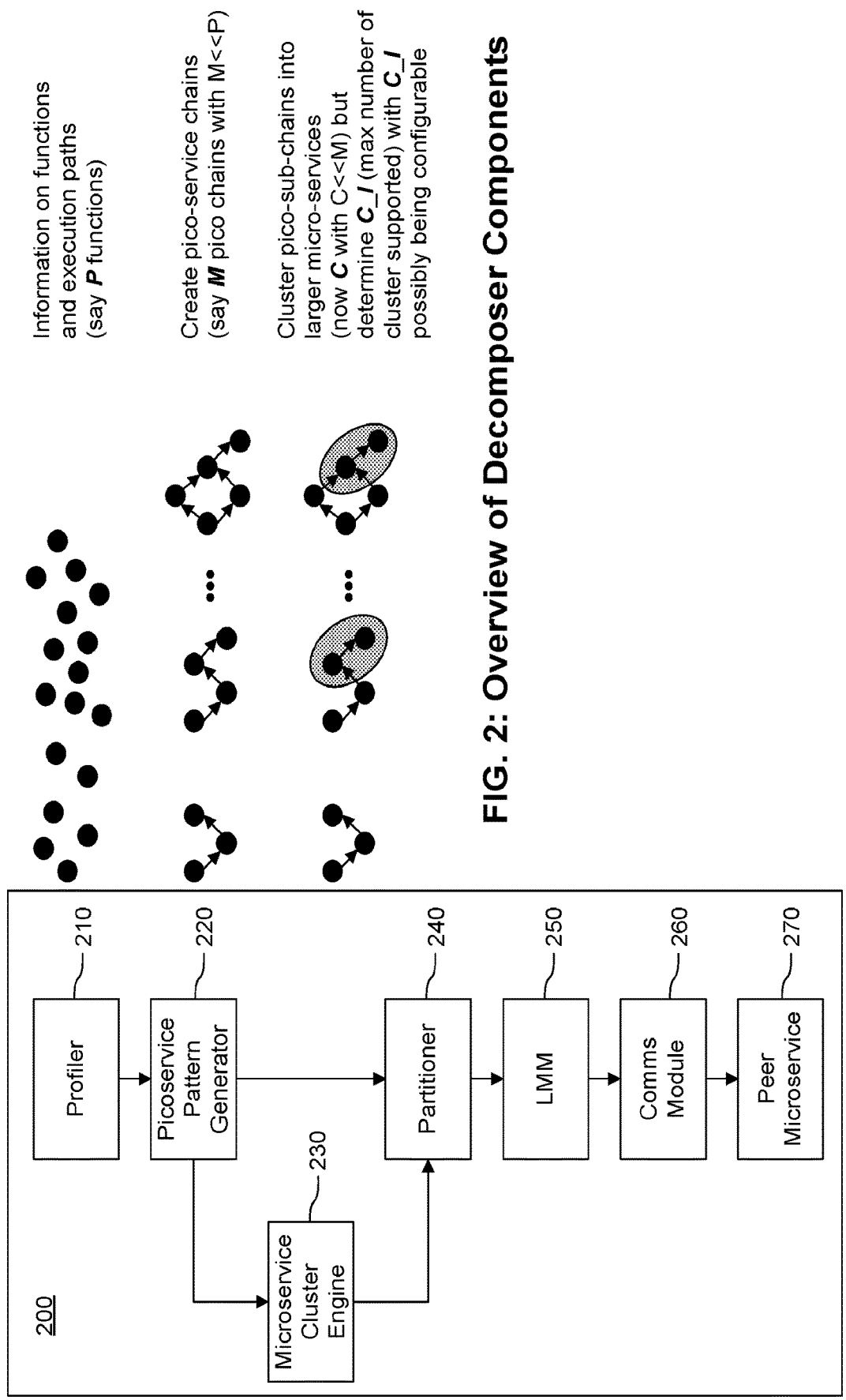
FIG. 2: Overview of Decomposer Components

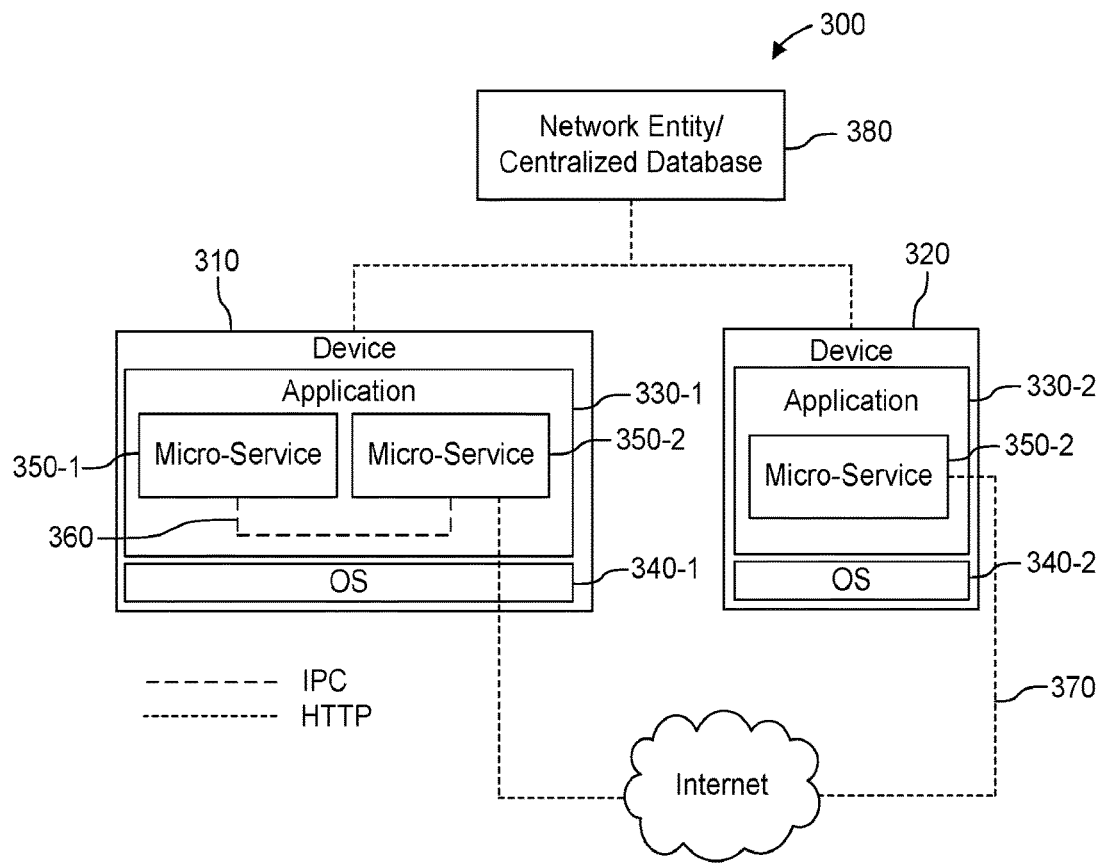
FIG. 3: Example of decomposed micro-services
In an application across two devices
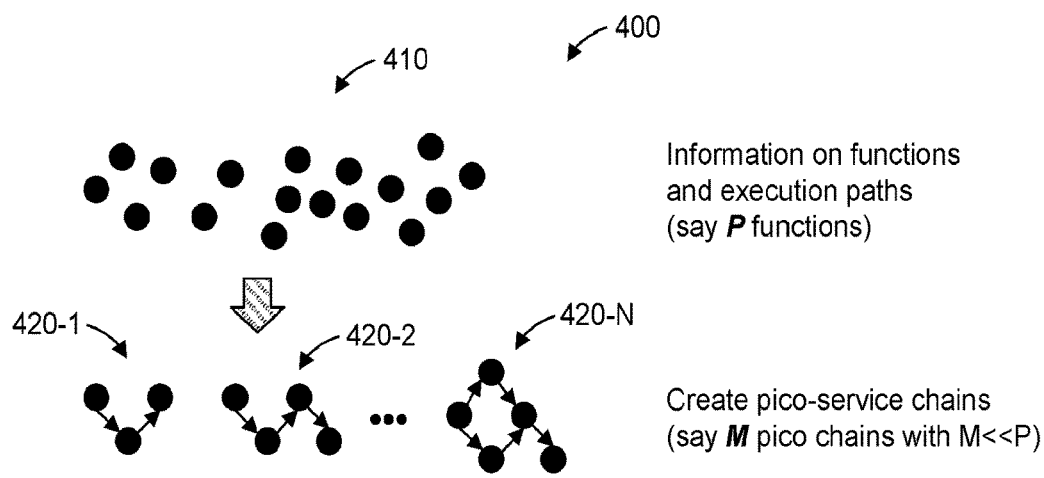
FIG. 4: An example of turning profiler
information into DAGs

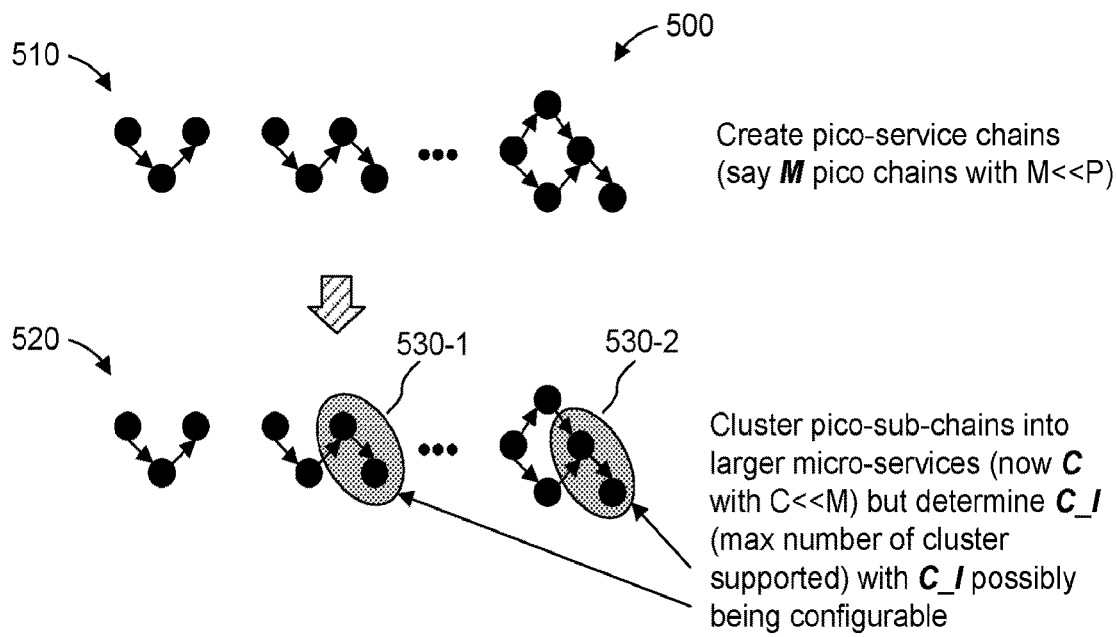
FIG. 5: Clustering Picoservices into Micro-services
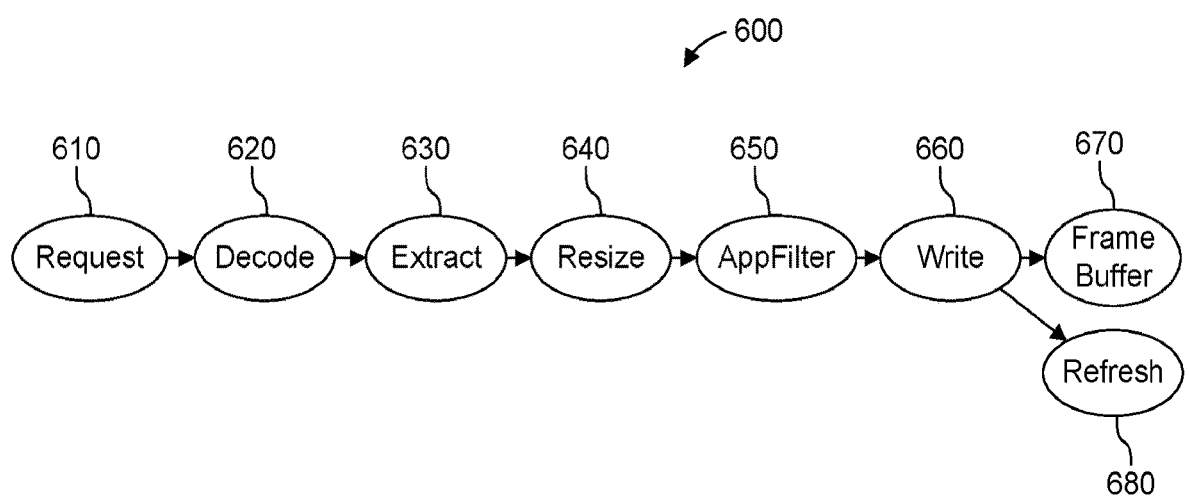
FIG. 6: Picoservice Pattern created as a DAG

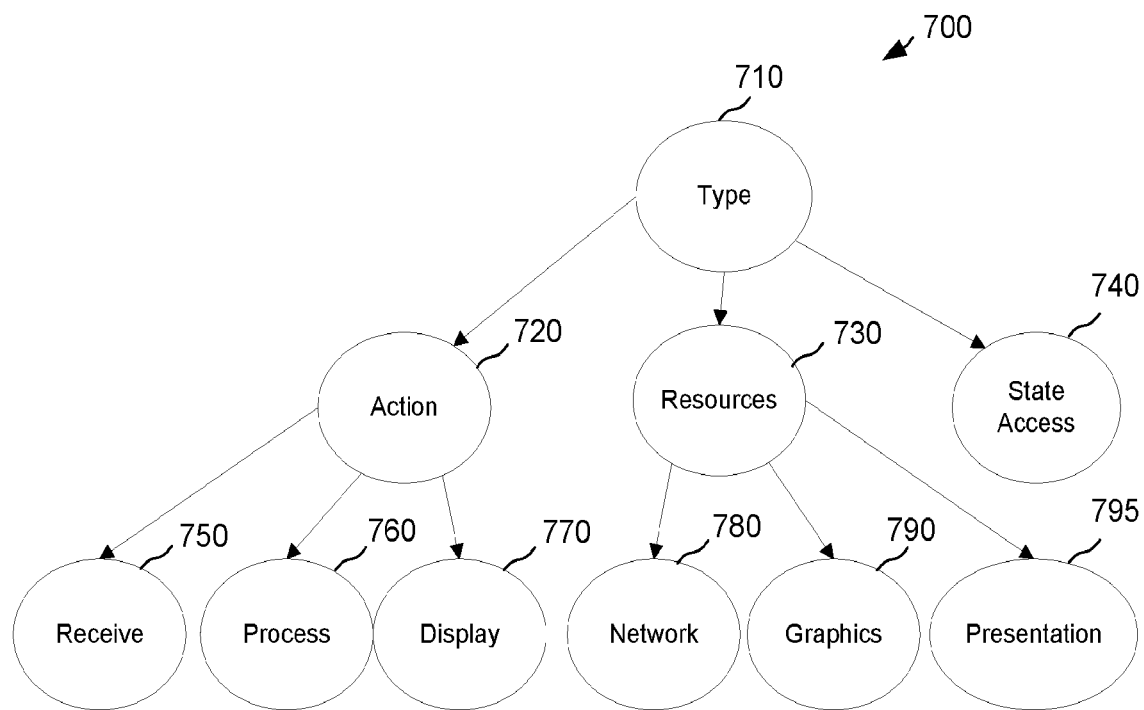
FIG 7: Type hierarchy of the ontology
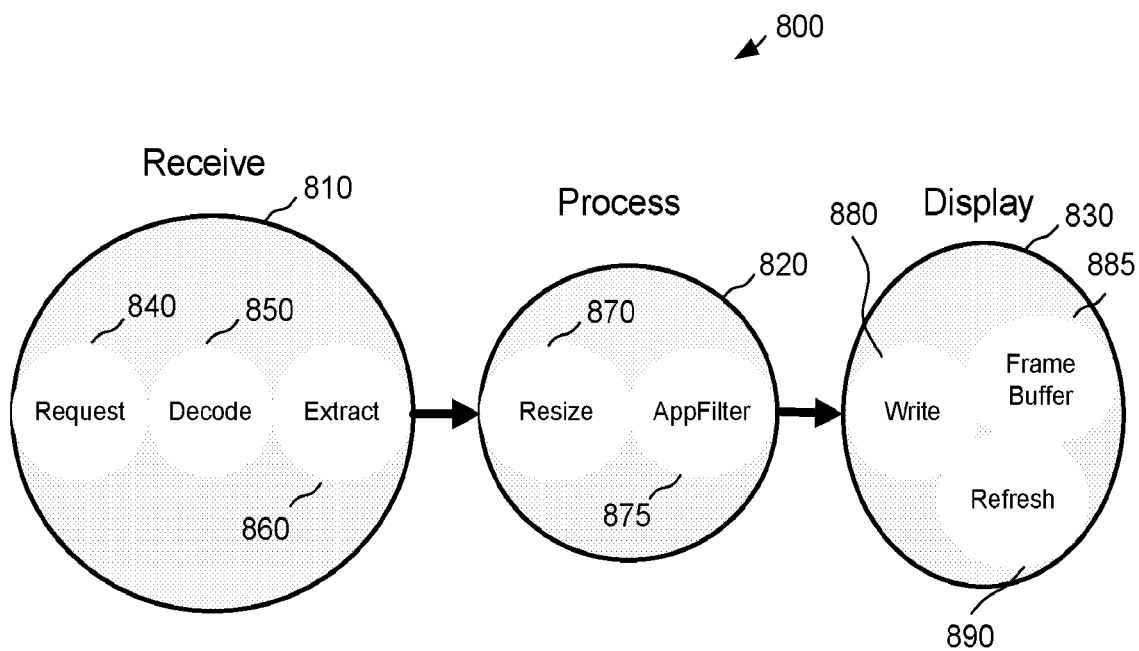
FIG. 8: Clustered microservice pattern, as an output of MCE

1110 — RECEIVE, FOR A PLURALITY OF END USER DEVICES, PROFILE INFORMATION ASSOCIATED WITH REMOTE EXECUTIONS OF MICROSERVICE PATTERNS ASSOCIATED WITH AN APPLICATION AND INCLUDING (1) AN IDENTIFIERS OF EACH RESPECTIVE END USER DEVICE AND ONBOARDING CAPABILITY INFORMATION INDICATING ONBOARDING CAPABILITIES OF EACH RESPECTIVE END USER DEVICE

↓

1120 — RECEIVE, BY THE CENTRALIZED DATABASE FROM A REQUESTING END USER DEVICE, A REQUEST FOR ONE OR MORE MICROSERVICES ASSOCIATED WITH AN APPLICATION

↓

1130 — DETERMINE FROM THE REQUEST, THE PROFILE INFORMATION ASSOCIATED WITH ONE OR MORE MICROSERVICES

↓

1140 — SEND, BY THE CENTRALIZED DATABASE TO THE REQUESTING END USER DEVICE, A RESPONSE INCLUDING THE DETERMINED PROFILE INFORMATION ASSOCIATED WITH THE ONE OR MORE MICROSERVICES

1210 — RECEIVE PROFILE INFORMATION PERTAINING TO AN APPLICATION TO BE EXECUTED ON AN END USER DEVICE THAT IDENTIFIES EXECUTION BOUNDARIES

↓

1220 — GENERATE, AT RUNTIME FOR THE APPLICATION, PICOSERVICE PATTERNS ALONG THE IDENTIFIED EXECUTION BOUNDARIES FOR THE APPLICATION

↓

1230 — PROVIDE THE GENERATED PICOSERVICE PATTERNS FOR CLUSTERING INTO MICROSERVICE PATTERNS

METHODS, APPARATUS AND SYSTEMS FOR DECOMPOSING MOBILE APPLICATIONS INTO MICRO-SERVICES (MSS) AT RUNTIME FOR DISTRIBUTED EXECUTION

CROSS REFERENCE TO RELATED APPLICATIONS

This application is a National Stage Application under 35 U.S.C. 371 of International Application No. PCT/US2020/055673, filed Oct. 15, 2020, and claims priority from U.S. Provisional Application No. 62/915,288, filed Oct. 15, 2019, the contents of which being incorporated herein by reference.

FIELD

Embodiments disclosed herein generally relate to wireless communications and, for example to methods, apparatus and systems for decomposing mobile applications into MSs at runtime, for example for the purpose of distributed execution.

RELATED ART

Generally, applications have been decomposed to enable microservices.

SUMMARY

Methods, apparatus and systems are disclosed. In one embodiment, a method implemented by an end user device to decompose an application at runtime includes collecting profile information regarding local executions of the application on the end user device and determining, by the end user device using the collected profile information, one or more microservice patterns to decompose a whole or a part of the application into at runtime. The method further includes partitioning, by the end user device at runtime, the application into: (1) a locally executed portion of the application to be executed by the end user device and (2) the determined microservice patterns to be locally executed by the end user device or remotely executed by an external entity in communication with the end user device.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 1B is a system diagram illustrating an example wireless transmit/receive unit (WTRU) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 2 is a diagram illustrating representative decomposer components;

FIG. 3 is a diagram illustrating an example of decomposed MSs in an application across two devices;

FIG. 4 is a diagram illustrating an example of turning profiler information into directed acyclic graphs (DAGs) (e.g., generating DAGs from profile information);

FIG. 5 is a diagram illustrating a representative clustering procedure to cluster pico-services (PSs) into MSs;

FIG. 6 is a diagram illustrating a representative PS pattern, for example created as a DAG;

FIG. 7 is a diagram illustrating a representative type hierarchy of an ontology; and FIG. 8 is a diagram illustrating a representative clustered MS pattern, as an output of a MS Cluster Engine (MCE).

FIG. 11 is a flowchart illustrating a representative method implemented by a centralized database or a network entity; and FIG. 12 is a flowchart illustrating a representative method implemented by a Picoservice Pattern Generator (PSPG).

DETAILED DESCRIPTION

Example Networks for Implementation of the Embodiments

Figure 1A:
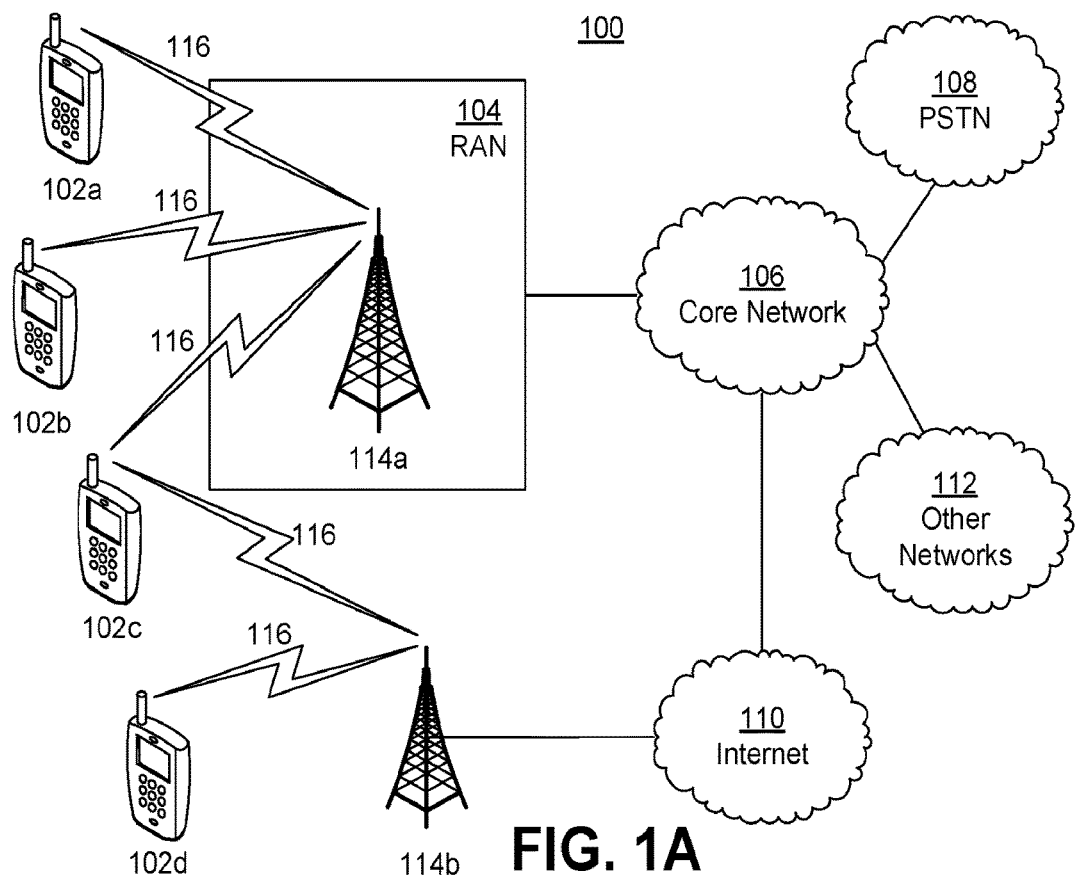
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), an end user device, a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an end and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
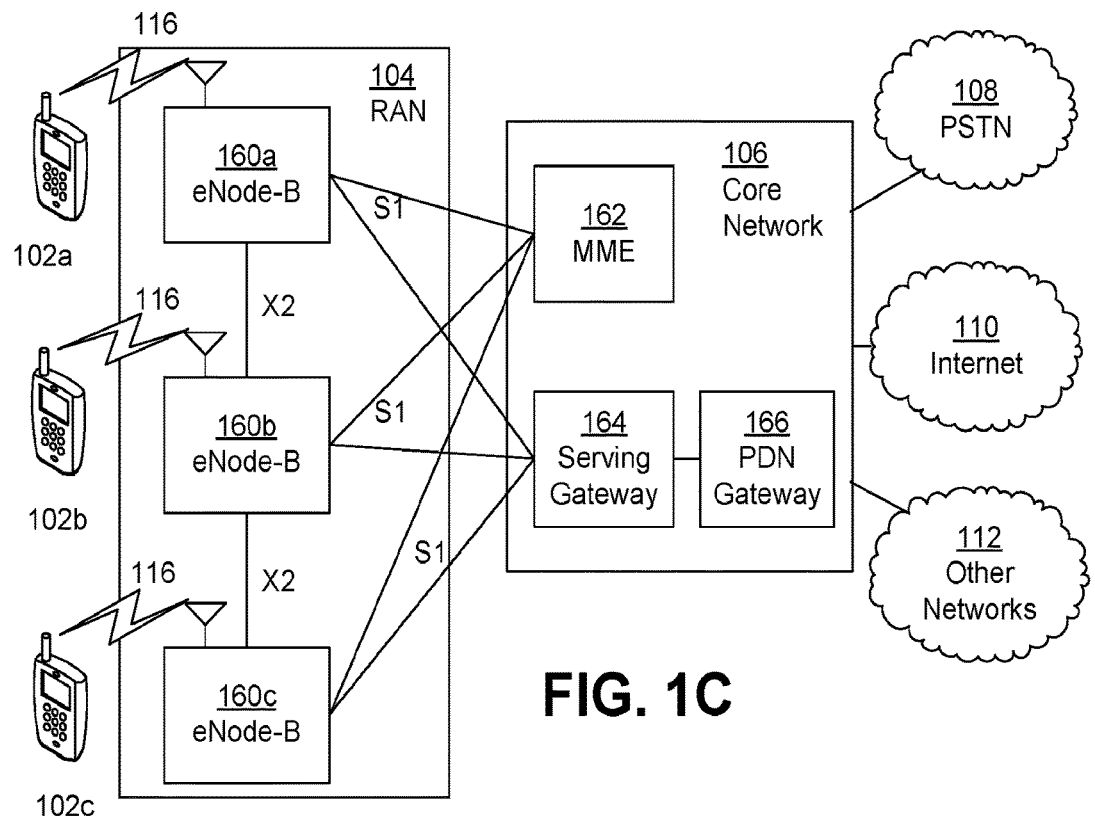
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different Protocol Data Unit (PDU) sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, methods, procedures, operations, system and/or apparatus may be implemented to decompose applications (e.g., existing applications and/or services) into a set of MSs that can be distributed beyond the initial runtime scope of the application and/or service.

In certain representative embodiments, a MS Cluster Engine (MCE) 230 may be implemented that may: (i) receive information for clusters of PSs from a PS Pattern Generator (PSPG) 220; (ii) create MSs by (ii) clustering PSs into MSs according to a given ontology; (iii) select the most suitable MS patterns (e.g., and may be realized by assigning a usefulness value per MS pattern (e.g., each pattern) and by selecting the strongest (e.g., best) one or ones (e.g., best candidate MS patterns), and/or (iv) present the most suitable MS patterns to a Partitioner 240 (e.g., to be used in the partitioning of a monolithic application into partitioned parts for example to be run on a distributed basis on different devices), among others.

In certain representative embodiments, methods, procedures, operations, system and/or apparatus may be implemented for modularizing/partitioning monolithically packaged applications into MSs at runtime, for example by (i) profiling an execution of the application (e.g., the monolithic application) to (ii) define a MS pattern around or in accordance with detected execution boundaries of the monolithic application, (iii) altering the application by adding suitable wrapper classes around the one or more MSs identified in the MS pattern, (iii) managing the execution of one or more MSs on a plurality of devices (e.g., a local device or remotely (e.g., via one or more other devices).

In certain representative embodiments, a Profiler circuit/component/module/function may be implemented that may: (i) monitor and/or collect (e.g., continuously monitor and collect information of local application executions, (ii) upload the collected information to a repository/storage unit (e.g., a remote repository), (iii) download profile information from the repository/storage unit; and/or (iii) provide combined profile information to produce a MS pattern along identified execution boundaries identified from the locally obtained and/or remotely downloaded profile information.

In certain representative embodiments, a PS pattern generator component/circuit/module/function may be implemented that may: (i) receive profile information pertaining to a specific application; (ii) generate PS patterns 420 along identified execution boundaries for the application and/or (iii) provide such PS patterns 420 for clustering, for example to optimize execution of the application or for generation of suitable PS execution endpoints.

Users may associate consumption of an application experience to a specific device, e.g., "I can play the game on my mobile device". The experience may be implemented as an 'application' on a particular device. To install an application on a device (e.g., and provide/consume a realized experience), the user determines (e.g., must always resolve to) the device on which the application is installed, e.g., "I need to use the mobile device to play the game, as I do not have the app installed on my tablet". For example, the application (and/or the experience) is constrained to the hardware capabilities locally on the device on which the application was installed, regardless of better capabilities that may be available and/or accessible to the user, e.g., the available home UHDTV may provide a better game viewing experience and/or the home PC may provide a faster rendering and/or may save battery life on the mobile device. The application that is installed on the mobile device of the user may not utilize capabilities other than the ones that the application is installed at. Applications may package the entire implementation into a single format, which may be used to install the executable code that makes up the application on the specific device at installation time.

For example, the user may want to consume the application experience on multiple devices. Providing the application experience on multiple devices, may use or may require additional resources (e.g., extra procedures/operations/steps), and may use and/or require user intervention. For example, the extra procedures/operations may include any of the following: (1) installing the same application on all available devices, (2) deciding on a best suited device for an instance, and/or (3) starting (sometimes switching) the application manually to gain an experience (e.g., a separate/different experience and/or a discontinued experience) on a chosen device, e.g., "I installed the gaming app on my Android phone to play when I am commuting, but when I am home I can switch to playing on the home UHD TV (for a better experience), by installing the app and logging in to synchronize gaming data". For example, the application is still constrained by the device (e.g., the only device) the application is running on (e.g., "when the game is started on the TV in high resolution, the frame rate has been reduced, but I can't utilize the home PC with a powerful GPU for rendering faster". Despite installing the application on more than one device, the experience is still limited to the device that executes the application at any point in time, e.g., the possible other devices on which the application has been installed are of no use at that point in time, therefore still limiting the experience to the single device of execution at that time.

In certain representative embodiments, method, operations, procedures and apparatus may be implemented to enable a multi-device experience, for example by replacing one or more applications (e.g., monolithic applications) with MSs. The MSs may encapsulate specific realizations of and/or a part of the overall experience. For instance, one MS might receive a video stream and a second MS may process decoded images of the stream. After delivery to a third MS, the third MS may display the stream on a suitable display/surface, such as a TV. In certain representative embodiments, the MSs may be distributed (e.g., executed on different contributing devices, for example while communicating with each other within a semantic defined through interactions of the experience). The communication between MSs may utilize HTTP-based communication protocols, such as REST and/or web services. In certain representative embodiments, MS 'wrapper classes' and/or modified local HTTP request handling may be implemented to enable the division of existing applications into MSs. Such approaches may be applied at design time of the application or at execution time. For a design time approach, the MS division, the wrapper classes and the design decisions on which MSs is to encapsulate which functionality are a part of an overall design process, leading to an application package with MSs being part of the package.

Applications without such a design time approach to MSs, which may be the vast majority of available applications today, are monolithically packaged, often as modules of executable code but without the use of MSs. The code within these monolithic application packages may be compiled targeting a specific set of device components that may be used when running the monolithic application package. As a consequence, a distributed (e.g., truly distributed) execution with the most suitable devices may be limited to those devices on which the monolithic application runs, as outlined herein.

In certain representative embodiments, procedures, methods, operations, apparatus and/or components may be implemented to decompose non-MS designed applications into MSs at execution and/or runtime, (e.g., after the design, packaging and installation of the application on a mobile terminal). The result may be a MS-enabled (e.g., established at runtime and/or dynamically established to meet best practices and/or runtime requirements), albeit initially installed as a non-MS enabled application package.

In certain representative embodiments, methods, operations, procedures, apparatus and/or components may be implemented to enable flexibility of an application in or during execution. For example, an application may be enabled to run on any number of devices based on execution time/runtime considerations. Inflexibility in today's application may be due (e.g., largely due) to their monolithic nature (and inability to modularize applications into parts) and due to the lack of methods and/or procedures for executing an application on more than one device. In certain representative embodiments, more than one device may be utilized by identifying and dividing applications into sub tasks, which may be encapsulated as MSs. The encapsulated MSs can be collectively executed using multi-device environments. For example applications may be decomposed into sub tasks that may allow the application to offload specific tasks (e.g., only specific tasks) to other devices (for example instead of offloading the whole application) in the form of executing suitable MSs on one or more other devices (e.g., remote devices). Once these application tasks are executed on the chosen devices, the result can be combined for providing the user experience (e.g., the ultimate user experience).

The decomposition may be done either at design time or at runtime. The application developer may decompose an application according to a set of predefined requirements that were deduced based on design time knowledge, e.g., decomposition of a video streaming application into D (Display)-P (Processing)-R (Receive) functions at design time. It is contemplated that the knowledge and decomposition decisions made at design time may become incomplete and/or obsolete at runtime (e.g., due to (1) different hardware/software configurations; (2) changing connectivity and/or (3) an availability of various peering devices, among others). For example, a particular combination of an MS-enabled application may be more efficiently or better run on certain hardware/software configurations, on certain connectivity arrangements and/or using certain available peering device capabilities, making design time decompositions possibly inefficient.

In certain representative embodiments, procedures, methods, operations, apparatus and/or components may be implemented to update instantaneous knowledge of the application and decompose a non-MS based application accordingly at runtime. Such an approach will not only allow support for existing applications that have not been design with MSs, but also may remove any burden for future applications to do so, leaving the task of decomposition to (e.g., entirely to) a decomposer method, procedure, operation and/or apparatus at runtime. This approach may open up the possibility to optimize the decomposition based on the constraints observed in the actual running system.

Interpreting various identified parts of the application (e.g., in the previous example, the rendering part, and/or the displaying part in the gaming application) as MS patterns may enable realization of flexible (e.g., highly flexible) composition and decomposition procedures/operations/methods. When decomposed with procedures disclosed herein, an application that was once standalone may become a collection of MSs instead that can be executed on more suitable devices than the one the application was originally installed and started on. For instance, in one example, the "rendering" and the "displaying" MSs may be executed on a home personal computer (PC) and a Ultra High Definition Television (UHDTV), respectively. The overall quality of experience may be increased (e.g., in the example, the game display resolution may be increased, while rendered faster for lag free/smooth gameplay).

FIG. 2 is a diagram illustrating a representative decomposer 200 (e.g., including decomposer components that include any of: (1) a Profiler 210, (2) a Picoservice Pattern Generator PSPG 220, (3) a MicroService Cluster Engine (MCE) 230, (4) a Partitioner 240, (5) a Local MS Manager (LMM) 250, (6) a Communication Module (CM) 260, and/or (7) a Peer MS (PMS) 270.

Referring to FIG. 2, a decomposer 200 may perform procedures/operations for a runtime decomposition, for example including: (1) the Profiler 210 performing application profiling for acquisition of application knowledge at runtime; (2) the PSPS 220 and/or the MCE 230 dividing the application into MSs and (3) the Partitioner 240 partitioning into network-enabled MSs (for example, the division may include a plurality of sub-operations, e.g., a PS Pattern generation and/or MS Clustering. Applications may go through these operations with the outcome including a collection of MSs that may be composed together for providing an application experience with a possibility to utilize distributed instances of those MSs in a distributed environment. The distribution may be enabled by the (1) LMM 250, and/or (2) the CM components 260 for distributed MS lifecycle and communication management, respectively. The LMM 250 and CM 260 (e.g., CM components) may allow for MS instances executed as PMSs 270, (e.g., on devices different from the device on which the application was installed (and started).

For example, the Profiler 210 may generate/obtain information on functions and execution paths associated with one or more applications. The PSPG may generate one or more PS chains. The MCE 230 may perform clustering of PS sub-chains into MSs. In certain embodiments, the maximum number of clusters supported may be determined, predetermined and/or configurable.

Modularization described herein is done based on information that is obtained from local decomposers. Since the local decomposer may collect information of local MSs (e.g., only local MSs), the decomposition of the local decomposer may take (e.g., only take) into account specific aspects of execution on the device. The local information may be extended if suitable information of the application, for example regarding identified MS patterns and their importance/priority, in other devices is used. The usage of remote information aims at increasing the efficiency of the local decomposition (e.g., if another device has an already identified MS pattern of a given application, this can be used for decomposing the local application with its MS boundaries information). In certain examples, if a peer device already has a "rendering" MS, profile information of the local application may be used by the local application to identify "rendering" application task boundaries and decomposition, accordingly.

Once or after a local application is decomposed into MSs, these local MSs may be offloaded to corresponding PMSs.

FIG. 3 is a diagram illustrating an example architecture 300 for decomposition of MSs 350 in an application across two devices. Referring to FIG. 3, each device 310 and 320 may include one or more applications 330-1 and 330-2 and operating systems (OS) 340-1 and 340-2. In an example scenario, an application 330 has been decomposed into a plurality of MSs 350-1 and 350-2 across the first device 310 and second device 320. The MSs 350-1 and 350-2 are identified on a plurality of devices 310 and 320 (e.g., two devices) with two MSs 350-1 and 350-2 being instantiated on a first device 310 and one MS 350-2 (e.g., a peer MS (PMSs) being instantiated on the peer device 320. FIG. 3 shows that IPC (Inter-process communication) 360 may be used for communicating between intra-device MSs 350-1 and 350-2, and/or HTTP 370 may be used for inter-device communication. In certain representative embodiments, first device 310 and peer device 320 may be in communications with a network entity/centralized database 380 which may collect profile information of the devices 310/320/102 on the network and may provide remote profile information to the devices 310/320/102 (e.g., upon request).

Although FIG. 3 shows two MSs for execution/executing in the first device 310 (e.g., a local device) and one MS (e.g., one PMS) for execution/executing in the second device 320 (e.g., a remote/peer device), the application may include any number of such MSs/PMSs 350. Moreover, any one or more of the PMSs 350 of the second device 320 may correspond to any one or more of the MSs 350 of the first device 310 to enable a corresponding MSs/PMSs 350 to be executed on either the first device 310 or the second device 320.

Although FIG. 3 shows first and second devices 310 and 320, any number of such devices are possible with any number of MSs/PMSs 350 dynamically set at run time for execution/executing on such devices.

Representative Procedures/Components for the Decomposer
Representative Procedures for the Profiler The Profiler 210 is a component (e.g., software and/or hardware component) that may use various dynamic program analysis techniques (e.g., event-based analysis procedures/operations, statistical analysis procedures/operations and/or instrumented analysis procedures/operations) to profile runtime parameters of applications, e.g., complexity, resource utilization, usage of instructions, function callers and function callees, among others. Conventionally, analysis techniques are generally used for application testing and maintenance.

Application Profiling in the context of a decomposer 200 may be used to identify execution points/path of interest (e.g., functions/classes with high CPU consumption, or execution points/path of interest that use instructions, for example for "displaying" frames), for further optimizing applications at execution time/runtime. The decomposer 200 may maintain different storage (e.g., multiple levels, e.g., 3 levels, of storage). The decomposer 200 may store profiled information in memory (e.g., Level 1 (L1)—instantaneous and most accessed information), and some information in persistent storage (e.g., Level 2 (L2)—longer term historical data in samples).

Level 3 (L3) profiler storage may be distributed storage made available to devices (e.g., all devices), where all profilers 210 upload their local profiler information. L3 profiler storage may be realized as a centrally managed database 380 (e.g., a network entity centralized database and/or cloud/distributed storage). Devices 310 and 320 may upload and/or download information using either a web API (e.g., REST), or using any other data transfer protocol (e.g., File Transfer Protocol (FTP), and/or Secure Shell FTP (SFTP), among others). Once uploaded, the devices 310 and 320 (e.g., all devices) may periodically download profile information of other peering devices of interest. In one example, the information gathered by local profilers 210 of both devices 310 and 320 may be uploaded to a known distributed storage and existing MS profiler information in the distributed storage may be downloaded by both devices.

The Profiler 210 may run (e.g., may run continuously in the background) and may provide information to the PSPG 220 for representing the execution points and their paths as Directed Acyclic Graphs (DAGs). The information that is passed to the PSPG 220 may include program execution traces, invoked system instructions, data consumed, data produced and/or resource utilizations at each execution point.

Apart from the executable (or object) code as a result, the Profiler 210 may provide structural information, for example through one or more code annotations (e.g., such as package and/or function names (albeit the information may be obfuscated). The output of the Profiler 210 may include execution dependency (e.g., fct X calls fct Y) as well as joint state information (e.g., fct X and fct Y access resources or variable Z).

Existing profilers, such as Android Program Profiler, Java Virtual Machine Tool Interface and/or Python hotshot, may be used for profiling application tasks. These profilers may be extended to include the output information (e.g., local and/or remote/non-local profile information) disclosed herein in case such information does not form part of an existing profiler output.

Representative Procedures for the PSPG

The objective of the PSPG 220 (e.g., PSPG component) may include to prepare and/or to store information that is received from the Profiler 210 to be used in later procedures/operations. In certain representative embodiments, the PSPG 220 may generate and/or turn the execution information into execution graphs. The generated execution graphs turn the output information of the Profiler 210 (e.g., function execution information and/or joint resource/data use information) into a sequence of services being executed along a well-formed execution path. For an individual function level, the services may be denoted as 'Pico Services' ('PSs'), due to their small/fine granularity. By clustering a plurality of PSs, MSs/PMSs 350-1 and 350-2 may be generated. For example, a number of PSs may be clustered together to form a single MS 350-1 or 350-2 (e.g., which may increase the size/complexity of the offered/distributed services).

The execution structure of a (profiled) program may be represented as DAGs (directed acyclic graphs) (e.g., a tree containing or including the class hierarchy, or the execution paths representing function invocations). Such DAGs may be enforced, e.g., in the case of loops, through well-known techniques, such as loop removal and/or serialization, among others. The DAGs represent identified PS patterns from the knowledge obtained from local profiling with nodes representing the identified functions of the program and edges between nodes representing calls between the nodes/functions.

FIG. 4 is a diagram illustrating a representative procedure 400 to turn profiler information into DAGs. Referring to FIG. 4, at 410, profile information is obtained on functions and execution paths associated with the application 330. At 420, PS chains are created (e.g., generated). For example, the FIG. 4 shows how the profile information 410 (top) is turned into the PS patterns 420-1, 420-2, . . . 420-N (bottom), which in turn may be presented to (e.g., used by) the MCE 230 to optimize service patterns as disclosed herein. In lieu of presenting the PS patterns 420 to the MCE 230, the generated PS patterns 420 may be presented to the Partitioner 240 directly for creating a fine grained, but possibly unoptimized, decomposition. In many applications, such direct portioning of (e.g., effectively every) functions of an application may lead to many PS patterns 420 at (e.g., possibly too) fine a granular level, leading to storage issues (e.g., keeping/maintaining the profile information in suitable storage on the profiling device). For example, PSs represent various objects indicated in the profiler information 410. The data flow between the objects, and the data flow directions, may be extracted, for example using object access information. The object access information may be included (e.g., may usually/often be included) in the profiler information 410 and for example, may be function caller/callee information. In the DAG, the objects may become/represent vertices, and their data flow may represent the edges that connects vertices.

In FIG. 4, the profile information 410 may include identified functions associated with the monolithic application or a part of the monolithic application and execution paths associated with the monolithic application or a part of the monolithic application. The PS patterns 420 may identify, generate and/or create PS chains.

The DAGs may be constructed by taking the Profiler information 410 as input, representing classes/functions as nodes and the information flow between classes (and included functions) as directed edges between nodes, as shown in FIG. 4. For example, the android application profiler may provide application traces including caller and callee information. A java.util.List data structure may be used to create graphs, in which the classes in the android trace are stored as nodes (with their related profiler information such as CPU utilization) and the caller/callee relationships represented as edges, storing them as references to the neighboring nodes.

Representative Procedures for the MS Cluster Engine (MCE)

The DAGs created by the PSPG 220 may contain or may include code level information (for example associated with a PS). When the Profiler 210 identifies function-level information, the PS patterns 420 may be granular (e.g., very fine-granular) for complex applications in which many such functions may exist, which may pose the challenges of possibly managing many (too many) PS patterns 420, likely leading to memory and storage problems on the executing device. After the PS generation, it is contemplated to optionally cluster one or more PSs into an MS 350, for example to reduce the overall number of possible MSs into which the application may be decomposed.

The MCE 230 may turn the PS patterns 420 (e.g., fine-grained PS patterns) into more coarse-grained MS patterns by, for example identifying and optimizing various functions within an application into 'hotspots' of execution based on their emerging patterns (such as execution being concentrated into a specific set of PSs or specific PSs using a dedicated hardware resource). The PSs may be clustered, if there is a dependency on a particular state (e.g., a state in memory such as in a shared memory or in persistent storage, such as a file). It may be beneficial to cluster those PSs together (e.g., for avoiding the need for or use of costly state management and/or concurrency handling).

The MSs 350 in the patterns may not only be executed locally, but may also be served to other devices 320 (turning the MSs 350 into PMSs 350-2) in the network. Per each MS, a MS onboarding decision (e.g., whether or not the MS can serve to one or more other devices 320 or any other network connected device) may be made, which may be uploaded to a central database 380 with the MS pattern itself.

Representative Procedures for MS Clustering

FIG. 5 is a diagram illustrating a representative procedure for grouping PSs into MSs.

Referring to FIG. 5, the representative procedure 500 may include at 510, one or a plurality of PS chains being created (e.g., generated). At 520, PS sub-chains may be clustered into larger MSs. The representative procedure 500 is illustrated through the circling of two or more PSs 530-1 and 530-2 as a possible MS. This clustering of PSs 530-1 and 530-2 into a MS (e.g., MS 350-1 or MS/PMS 350-2) may be performed based on a set of concepts (e.g., an ontology) that capture the clustering criteria. The concepts may be specified and/or presented to the MCE 230 as a knowledge base of MS execution characteristics, specified using existing ontology languages (e.g., Web Service Modelling Ontology, or other Ontology models, among others). The PSs 530-1 and 530-2 may be grouped according to the provided ontology, matching with runtime knowledge of the PSs 530-1 and 530-2 gathered through profiling. Further details of matching ontology entities with application/program code are disclosed herein.

Representative Procedures for Selection of MS Patterns to be Realized

The clustered MSs represent various hotspots (e.g., properties of which may depend on the characteristics of the ontology used) in the application 330 with certain execution paths, represented in the MS patterns that result from the previous operation/step. A subset (e.g., only a subset) of the MS patterns (e.g., all of the MS patterns) may be possible to be realized due to constraints imposed by resources of a device. For instance, a large number of MS patterns may not be able to be realized and/or managed due to memory constraints. For example, memory constraints may limit the number of MS patterns that may be realized, for example because each MS pattern may use (e.g., to be held in) memory or at least be stored on persistent memory. To choose the MS patterns (e.g., the most suitable MS patterns), The MS patterns (e.g., each MS pattern) may be ranked based on a calculated rank (e.g., a rank value) that may be calculated based on a combination of local and remote ranks. MS patterns with total rank values up to certain threshold $C_l$ may be chosen to be realized by the Partitioner 240. Further details of selecting MS patterns are disclosed herein.

Representative Procedures for the Partitioner

At the Partitioner 240, the MSs 350 in a chosen MS pattern (e.g., each chosen MS pattern) may be translated into relevant classes (using class information stored in the MS pattern information). Wrapper classes that implement communication procedures (e.g., HTTP) may be placed around a specified MS (node) boundaries, to realize the 'start' and 'end' points of the MS 350 (e.g., each MS) and connectivity between MSs 350 in the application 330.

It is understood that the terms "PMS" and "MS" are interchangeable but may be executed, for example, using different (e.g., local and/or remote) devices.

The code of the application 330 may be updated at runtime when adding the wrapper classes around the nodes, e.g., by loading the changes (e.g., wrapper class and/or other interfaces) into the application 330 using the java instrumentation API. In certain embodiments for Java-based runtime systems such as Android, the Java Instrumentation API (e.g., ClassFileTransformer) or the ClassLoader class may be replaced with offloading procedures (e.g., replace the content in functions for local execution with networked procedures). Wrapper classes may be used for partitioning and realizing procedures for inter-MS communication. Depending on the application runtime used, the partitioning may happen at the level of source code, object code or executable code. In the example of Android, object code may be used in the installation of the application, while a just-in-time (JIT) compiler may be used to create more efficient executable code at the application start. Using the Java instrumentation classes, object code may be wrapped into the wrapper classes, issuing a renewed JIT compilation request for the MS enabled application (e.g., currently (e.g., now) MS enabled application).

During the now renewed execution of the, now MS enabled code, the modularized MSs (with their wrapper classes) may be added to the LMM 250 (e.g., by passing a reference to a created MS wrapper class).

It is contemplated that for code coverage: since the Profiler 210 returns (e.g., only returns) information by actively utilized code components, the active components (e.g., only those active components) may generate (e.g., may be turned into) MS patterns and may be partitioned, as disclosed herein. The 'remaining' part of the application 330 may form a constituting part of the execution (e.g., the remaining part can and may be called, if required) with a limitation that the remaining part is not able to offload any execution unless the remaining part is profiled and is turned into a PS 510 and eventually MS pattern. This highlights the dynamic nature of the decomposition disclosed herein. Because the execution behavior may change over time, e.g., through changing user behavior, the profiled functions and the generated PS (and ultimately MS) patterns may evolve over time, opening up the opportunity to offload MSs (e.g., PMS 350-2) 'generated' at later stage with functionality that was previously kept local to an original device. As an example, for a multimedia player, being able to play videos and/or music. If the user originally uses the video playout capability, the MS structure may be generated as disclosed above, namely one or more MS 350 may be generated regarding receiving a video stream, processing the video stream, and displaying the video stream. Since the music playing function is not used (e.g., may never be used), possibly large parts of the application may remain 'monolithic', effectively leading to, for example one or a plurality of MSs/PMSs 350 and a part of the application 330 executed purely locally. Later runs of the profile may provide (e.g., eventually provide) information regarding use of the music playing function by an end user, which may generate a further (e.g., now further) decomposition of the remaining monolithic part of the application 330 (which has already been partially decomposed into an MS based application 330) with MSs specific to music playing. Other parts of the application 330 may remain monolithic even after this evolution into further MSs/PMSs 350. For instance, the application 330 may provide media management functionality (e.g., sorting videos and/or music, etc.) which the user does not use, which may not be profiled and may remain monolithic (e.g., which illustrates that the decomposition procedure disclosed herein may be an evolving process, leading to evolving structures over time).

Representative Procedures for the LMM

The LMM 250 may manage the locality of a MS 350 (e.g., each MS), for example whether to execute a MS 350-1 and 350-2 locally or whether to send a request to a PMS 350-2 executing in the network (e.g., taking/using weight parameter added in the DAG). The LMM 250 may take the MSs 350 provided by the Partitioner 240 and may manage their life cycle, for example by keeping a list of available (e.g., all available) MSs 350 in memory, for example by storing a reference to the MS object/wrapper class in a table (e.g., a hash table or reference table, among others). The decision on the locality of the MSs 350 may be passed to the CM 260. For example, for the decisions relating to MS locality, an entity (e.g., a Device Packaging Entity (DPE) may be implemented. The DPE may collect suitable context information from participating devices in a distributed system; may match the context information against constraints set out in a dynamic programming (DP) based specification of a given end user experience. The DP entity may also select a set of resources optimally matching the constraints within the DP model and may instruct the resources to establish name-based relations suitable for the exchange of information pertaining to an execution of a suitable MS function chain that can realize the DP model and the defined user experience.

Representative Procedures for the CM

The instructions on whether a MS request is sent to a local MS 350-2 or to a PMS 350-2 over the network 370 is received from the LMM 250.

The CM 260 may handle requests and responses between MSs 350-1/350-2 and/or MS 350-1 and PMS 350-2. When MSs 350 are not offloaded (e.g., the MSs 350-1 and 350-2 are running on the device locally), the CM 260 may indirect the MS requests using an intra-device communication procedure 360 (e.g., IPC), to a local MS instance (e.g., two MSs 350-1 and 350-2 that are executing on the same device may communicate over the IPC 360 (as shown in in FIG. 3 relating to the IPC interface). If either one of the MSs 350-1 and 350-2 is offloaded, the requests may be sent to corresponding PMSs (e.g., PMS 350-2 corresponding to MS 350-2) using network requests (as shown in FIG. 3 relating to the HTTP interface) in which one MS 350-2 may be offloaded to another device, turning MS requests into HTTP (over IP) and sent over the Internet 370. Procedures are described in a U.S. Patent Publication No. US2018/0007116, the contents of which are incorporated by reference herein, for the sending of HTTP service requests. The HTTP service requests may be sent over an ICN or conventional Apache HTTP components or Android Volley HTTP classes may be used, while device-local requests are sent via IPC 360.

Representative Procedures for a PMS

A PMS 350-2 may be a MS 350-2 that can execute the offloaded MS 350-2 and produce the expected outcome. The PMS 350-2 may receive the offloaded request and may execute with the input data received. When doing so, the PMS 350-2 may resolve and use other application dependencies (e.g., all other application dependencies) (e.g., required classes), using the application code/data that is made available (e.g., using Java reflection API). Once the requested portion of the application 330 is executed, the PMS 350-2 may encapsulate the result in a response (e.g., a HTTP response) and may reply to the initial request (e.g., HTTP request) (for example in FIG. 3, the offloaded PMS 350-2 may receive one or more requests over the Internet 370 (using HTTP), may execute the requests, and may respond back (e.g., to the initial request or requests) over the Internet 370 (and/or any other communication network). In certain representative embodiments, the MS 350-2 may exist locally on the same device (as in FIG. 3) and, in which case, the CM 260 may ensure the delivery to the MS 350-2 through the local IPC 360.

Representative Procedures for Clustering PSs into MSs Using Ontologies

The procedures for clustering PSs into MSs/PMSs 350 may turn/generate many (often too many for a useful distributed execution) PSs into a smaller number of MSs 350, and may make those smaller number of MSs/PMs 350 better manageable.

When clustering PSs into MSs/PMSs 350, instead of using a fixed set (e.g., a simple fixed set) of categories (describing the characteristics of each MS), ontology-based techniques/architectures may be used to capture MS types, subtypes and their relationships, as a set of inter-related concepts. In certain embodiments for capturing such ontologies, languages such as OKBC-KRS may be used to describe, present and/or implement application classification ontologies.

Subtyping may allow MSs/PMSs 350 to be identified that have similar/related characteristics, e.g., a type 'Receive' with two constituting sub-types, 'video segment receive with decoding' and 'video stream receive with decoding'. The characteristics of an ontology itself may dictate characteristics of a resulting clustering of MSs/PMSs 350, e.g., a vendor may decide to use a proprietary (advanced) ontology for clustering MSs optimized for particular hardware (e.g., a device's hardware). While the type of action (for example a receive action, or a process action, among others) may be one type of the clustering ontology. The type of resource may be another type in the ontology used (e.g., differentiating PSs that access video capturing resources from other PSs that access audio resources). Sub-types may be more specific to the resource types (e.g., a front camera subtype or a back camera subtype). Another type may be a type of state access (e.g., differentiating PSs without a PS-external state dependency from PSs that do access an external state. Sub-types may be generated dynamically based on the state information (e.g., represented, for instance, through global variable names provided by the Profiler 210) with the sub-type names being those variable names. The PSs accessing a joint state may be clustered, avoiding the need and/or use for explicit state management and for example for the cases where the PSs (that may be converted to (e.g., turned into) MSs/PMSs 350) may be executed in distributed locations.

The ontology entities may represent MS types such as those outlined herein, and specific MS characteristics may be stored as values of properties associated with each type. For example, for a type of action, an identified 'receive' PS may receive the property 'codec' for an indication of the 'receive' action (rather than a playout action) with a value 'android.media.MediaCodec' (e.g., as the utilized system API, in this case for an Android system). These property values can be matched with information that is received from the Profiler 210 of the PS (e.g., each PS) (for example, the profile information of the MS/PMS 350 may include application traces of invocations to 'android.media.Media-Codec' android system API. The importance/priority of a given property to the MS type may be indicated by an associated weight, (e.g., multiple MSs/PMSs 350 may share some specific characteristics (the same property may be included in more than one type). Certain characteristics may be more important to certain MSs/PMSs 350 than to others, which may increase the flexibility of defining subtle differences between ontology entities (e.g., and between the resulting MSs/PMSs 350).

One PS (e.g., mostly the PSs in MS boundaries) may be classified under more than one MS type (for example matching with more than one MS property value, belonging to different MS types), such as one PS having characteristics that fall under two MS types (e.g., one PS using instructions that may be a property value of more than one MS type). In certain representative embodiments, using an ontology entity, the most suitable MS type of each PS may be identified (as the PS may be matched under more than one MS type). To find a best matching MS type, a 'match value' m per each type match of a PS may be assigned based on the properties matched, as set forth in Equation 1 as follows.

$$m = 1 - \frac{1}{1 + \sum_{i=1}^{n} p_i} \quad (1)$$

where, $p_i$ represents a weight associated per each property of a MS type and n is the number of properties matched of a given MS type. It is contemplated that $p_i$ may be assigned per each property i and may be included in the ontology by an ontology developer. Once values of m for all possible MS type matches of a PS are calculated, the type with the highest 'match value' m may be assigned to the PS. Likewise, a MS type per each and every PS may be assigned. In certain embodiments, the PSs with the same type may be clustered together. In various embodiments, the clustering may be based on sub-types, e.g., for the type of action, where the sub-actions are distinctly different, albeit the type information is the same. In the 'Receive' type example above, the 'stream' vs 'segment' decoding may lead to a clustering where stream handling (e.g., using and/or requiring metadata parsing capabilities) may be handled by one MS and the segment decoding (using and/or requiring video decoding capability, including the possible use of a GPU) may be handled by another MS/PMS 350.

After clustering is finished, refactored versions of the DAGs may be generated/created with nodes (e.g., now nodes) representing MSs/PMSs 350 (instead of PSs) and edges representing the information flow between the nodes.

As seen above, the characteristics of the resulting MS pattern and the individual MSs may be dependent (e.g., highly dependent) on the provided ontology. These ontologies, which may be defined at design time (e.g., by the ontology developer), may be optimized using Artificial Intelligence (AI)/Machine learning (ML) techniques by 'evolving' the ontology further (for example by using relevant synthetic training data and/or gathered real data in all storage types described herein), towards improving its clustering effectiveness, (e.g., learning to classify application functions/MSs/PMSs 350 more effectively).

Representative Procedures for Selection of MS Patterns

To reduce a size of the MS patterns to be realized by the Partitioner 210 and held on the execution device, MS patterns may be chosen based on a level of importance/priority a MS pattern has on the application 330. This importance level is referred to as 'usefulness' in the following.

Representative Procedures for Limiting a Number of Patterns Realized

MSs patterns may be chosen to be realized with a cut-off defined through a threshold (e.g., a threshold value $C_l$). The threshold may depend on the definition of a ranking metric and/or settings of the device. For instance, the threshold may be set in accordance with (e.g., in direct dependency on) memory requirements and may be set to limit the decompose functionality. In certain embodiments, the decompose limit may be set in accordance with the realization of a User Interface (UI) (e.g., one or more UI settings). For example, the decompose limit may be selected as a term of and/or based on, e.g., memory size that may be provided for the functionality (e.g., for the UI). This selected memory size may be translated into a maximum number of MS patterns that may be realized with the defined memory size. In certain representative embodiments, the UI may allow for directly setting the maximum number of MS patterns that may be realized (e.g., provided). Such a setting may be system-wide (e.g., the maximum number of MS patterns the overall device may support) or may be application-wide (e.g., the maximum number of MS patterns the application 330 may support (e.g., be decomposed into). In certain embodiments, the threshold may be defined by the operating system, which may be similar to limiting the memory heap size of individual applications system-wide. In certain representative embodiments, the threshold may be expressed as a device property.

The MS limit value may be determined dynamically using learning techniques (e.g., via ML), by learning the effect of the chosen limit on the efficiency (e.g., quality of experience) and/or by optimization over time, accordingly.

Representative Procedures that Utilize Local and Remote Information

In certain representative embodiments, procedures may be implemented that use information (e.g., profile information) from: (1) purely device-local decomposition operations; or (2) device-local decomposition operation (e.g., from the local device) and remote information. Because the procedures for decomposition may be executed in (possibly) every device that runs the installed application 330, the initial profiling operation and the MS clustering may yield an outcome that is dependent (e.g., highly dependent) on the usage patterns observed on the device 310 on which the decomposition operations are executed. For instance, a user merely using video capabilities of a multimedia player may not or will not create the necessary profile information to decompose the possible music playout part of the application 330. A user on another device 320 may purely use the music playout functionality, yielding profile information including the music-oriented usage information. For these two different devices 310 and 320, even if usage is overlapping or similar (e.g., with both users using the video playout capability), the profile information may differ (e.g., because additional processing for scaling the video is only used by one of the users).

When considering (e.g., purely considering) such local knowledge, the MS decomposition may result in patterns purely 'useful' for the local user. Although there is a likelihood that behaviors do align strongly among a large enough set of end users, which may create/generate the same MS patterns across those users, procedures may be implemented that stimulates the inclusion of other users' information into the MS selection, leading to emphasize MS patterns that may be a highest priority for the local user and still identified as being useful for remote users.

The local user may become an attractive target for utilizing its resources for the execution of remote users' MS patterns, which, in turn, may be reciprocated by remote users doing the same, ultimately providing increased diversity in provided MSs/PMSs 350 in the distributed environment.

For this, the 'usefulness' of a MS pattern on the specific local device on which the decompositions are being executed (representing the importance of a MS pattern locally on the device) may be complemented with remote information, (e.g., the importance/priority of a MS pattern among other devices in the system to constitute the 'total usefulness' of a MS pattern. This combination may be achieved through the total usefulness of a MS pattern $u_{total}$ calculated as set forth in Equation 2, as follows:

$$u_{total} = u_{local} * \alpha + u_{remote} * (1-\alpha) \quad (2)$$

where, $u_{local}$ is the device local usefulness of the MS pattern, and $u_{remote}$ is the usefulness of the MS pattern among other devices. A weight value $\alpha$ may be assigned, indicating the importance/priority of the local and remote usefulness themselves to the total usefulness of the MS 350. Similar to the threshold (e.g., threshold value), it is contemplated that the weight $\alpha$ may be defined through system settings, possibly exposed to the end user through system-wide or application-wide settings of the UI.

In certain embodiments, $u_{remote}$ may be an average sum of all $u_{local}$ values of the same MS pattern, calculated by other devices in the system and provided using storage (e.g., distributed storage) for the remote profile information. The $u_{remote}$ value may be calculated locally by each device 310 and 320, by retrieving all $u_{local}$ values uploaded to the distributed storage. The $u_{remote}$ value may be calculated as set forth in Equation 3, as follows:

$$u_{remote} = \frac{1}{n} \sum_{i=1}^{n} u_i \quad (3)$$

where, $u_i$ is the $u_{local}$ uploaded to the distributed storage by device i, and n is the number of values retrieved from the distributed storage. The unique identifier of the pattern may be calculated locally and used for querying for the $u_{local}$ values from the distributed storage. Each MS pattern may have an associated $u_{local}$ values The MS patterns may be ordered according to their $u_{total}$ values and one or more MS patterns may be selected (e.g., chosen) based on a threshold value (e.g., one or more MS patterns that have an associated $u_{total}$ value above the threshold value C).

Each MS/PMS 350 may be identified by a unique MS identifier that may be created, e.g., by calculating a hash value over the string of included (e.g., all included) class names, ordered first according to class hierarchy and then alphabetically (for names at the same level in the hierarchy), e.g., md5(name$_1$+name$_2$+ . . . +name$_n$). For example, MSs/PMSs 350 with the same class/package structure may get the same identifier. The MS name and the onboarding decision (computed as described in herein) may be stored as a name-value pair in the distributed storage. Similarly, since a MS pattern may be a specific composition (e.g., a constellation of MSs/PMSs) of more than one MS/PMS 350, a unique pattern identifier may be created by appending the initially created identifiers of the MSs/PMSs 350 in the pattern in a corresponding order, (e.g., the MS patterns that contain the same MSs in the exact order get the same identifier). Another name-value pair, the pattern identifier and its $u_{local}$ may be uploaded to the distributed storage, making information about an individual MS/PMS 350 as well as their various compositions available in the distributed storage, which may later be used for further optimizing (e.g., through AI learning algorithms) patterns in the overall distributed system.

It is contemplated that the distributed storage can be implemented through a centralized database, e.g., providing by a network operator or selected among local users/devices 310 or 320 through a voting mechanism, and distributed schemes such as ledgers can be used for distributed realizations of the database.

Representative Procedures for MS Pattern Selection Based on Usefulness

The MS patterns (for example having $u_{local}$ values exceeding a threshold) represent the number of ways the application 330 (or a part of the application 330) may be partitioned. At each iteration some of all MSs may be selected to be later realized by the Partitioner 240, (e.g., the MCE 230 may create/generate plurality of MS patterns (e.g., 5 MS patterns), but due to the high cost in managing 5 MSs, only a subset (e.g., two MS patterns) may be selected). The maximum value of $C_I$ may be set to a positive integer (e.g., the maximum value of $C_I$ may be set to 2 in this example).

To choose a particular MS pattern (e.g., a first MS pattern instead of a second MS pattern), a grading metric may be implemented that may be based on an individual MS 'usefulness'. In this context, the 'usefulness' of a MS may be defined based on a chosen device optimization objective, such as an increased 'opportunity to offload' each MS but equally an increased 'opportunity to be offloaded to'. In certain representative embodiments, both opportunities may be presented as a linear positive number. 'Usefulness' may be view from the objective to decompose in the first place, e.g., to be able to either offload to another device or fulfil MSs for other patterns in the overall distributed system.

MS pattern selection carried out to increase the 'usefulness' of MSs, may further satisfy various specific requirements/conditions, such as the ones listed below, which may be configured at initialization time through device configuration files. For example, MS patterns may be selected with certain characteristics such as any of:

(1) All MSs 350-1 and 350-2 in the pattern are offloadable or can be offloaded to
  (e.g., the device vendor may favor patterns where all of the partitioned MSs may be offloaded, so that minimal operations are executed on the primary end device. When an opportunity to offload arises (e.g., when connected to the network, all MSs 350 may be or are offloaded, and, for example, all MSs 350-1 and 350-2 may be executed locally when offline). Therefore, only the MS patterns in which all included MS 350-1 and 350-2 are offloadable may be useful).

(2) At least one MS 350-2 in the pattern is offloadable or can be offloaded to
  (e.g., this configuration enforces that the device to always offload at least one MS 350-2. Such a strategy may be useful in scenarios where offloading all MSs 350-1 and 350-2, or not offloading all MS 350-1 and 350-2 may lead to high costs (e.g., offloading all MS 350-2 may incur high network costs (for example due to the amount of data that needs to be transferred), and executing all MSs 350-1 and 350-2 locally may incur high energy costs.

(3) All MSs 350-2 are offloadable apart from retaining at least one MS 350-1 locally
  (e.g., this configuration enforces MS patterns which have at least one (or only one) locally executing MS 350-1. Such configurations are useful in scenarios where the device vendor may prefer to execute only one MS 350-1 locally at a point in time. In an application, there may be application parts that should not be or are not to be offloaded. For example, parts of the application 330 are not to be or should not be offloaded due to security reasons, there may be certain MSs 350-1 with functionalities that the application developer intends always to be executed locally (e.g., such as video displaying capabilities), or the device 310 or 320 may be able to host only one MS 350-1 or 350-2, respectively with a required level of efficiency, given hardware capabilities of the device 310/320).

(4) Minimum number of nodes
  (e.g., although, the number of nodes (MSs) in a MS pattern may increase the opportunity to distribute the MSs 350 across a distributed environment and increase parallel execution of aspects of the original application, it may also increase the communication cost and management overhead. With this configuration, in certain representative embodiments, the MS patterns with lower numbers of MS 350 may be favored over the MS patterns with higher numbers of MSs 350. With this configuration, in certain representative embodiments, the MS patterns with higher numbers of MS 350 may be favored over the MS patterns with lower numbers of MSs 350, for example to process tasks faster using parallel processing. There may be instances where closely related MSs 350 may be combined into larger MSs 350, instead of having specific smaller MSs. For example, in a video streaming application, it may be preferable to choose an MS pattern that combines a MS 350 that writes to the device 'framebuffer' and another MS 350 that adjusts frames to fit the display screen settings into one larger MS 350, over a pattern that has two smaller MSs 350 separated).

The opportunity to offload depends on the availability of other devices in the network that are capable of hosting PMSs 350. The offloading opportunity of a MS 350 may increase with the increase of other devices onboarding (or hosting) corresponding PMSs 350 in the network (as reflected in $u_{remote}$, as disclosed herein). Likewise, for a MS 350 to be 'useful' locally and for having enough 'strength' to allow onboarding, the MS 350 (and the MS pattern) may or must possess certain characteristics, which may be in turn reflected in the local usefulness value $u_{local}$ of the MS pattern. All devices 310 and 320 may calculate the usefulness value locally, as a sum of all strength/usefulness values (e.g., and the onboarding decision may use these local usefulness value) of MSs 350 in the pattern, before uploading to the distributed storage, as set forth in Equation 4, as follows:

$$u_{local} = \sum_{x \in S} \text{usefulness}(x) \qquad (4)$$

where usefulness(x) returns the local usefulness value of an individual MS x in the pattern S.

In certain embodiments, the local usefulness of a MS 350 may be defined as its onboarding capability e.g., the MS's ability to efficiently execute the MS 350 locally (being useful not only for local execution, but also for serving other patterns) and utilizing device resources efficiently.

The MSs 350 that utilize device resources efficiently may be identified using the information received from the Profiler 210 (e.g., instructions used) and the APIs used within the MS. For example, a MS 350 may be considered useful, if it "directly" accesses any resources through system/native interface invocations. It is contemplated that a MS 350 may be useful, if it directly uses instructions related to the following device resource categories:

(1) User Interaction
  a. User output (e.g., display, haptic feedback)
  b. User input (e.g., keyboard, tactile sensors)
(2) Processing
  a. Any specific purpose-built hardware other than a Central Processing Unit (CPU) (e.g., a Graphic Processing unit (GPU), a Neural Processing Unit (NPU), and/or a Quantum Processing Unit (QPU), among others).

The CPU has been left out from the above list, considering MSs 350 that use only general-purpose CPU instructions has less significance locally to be realized due its general nature (modularizing may incur further performance inefficiencies, but might benefit from offloading onto devices with hardware acceleration). MSs 350 that use more purpose-built hardware locally may be considered more optimized and likely purpose-built hardware may improve performance of a MS pattern when onboarded. If there exists a MS 350 that executes only CPU instructions locally (yielding a low usefulness value), and there exists devices that can onboard the same MS 350 remotely that can execute with more efficiency (e.g., with hardware acceleration yielding higher remote usefulness values) then offloading can potentially increase the performance of the overall MS pattern. This may be achieved when remote usefulness of the MS pattern is more important (e.g., established as a higher priority) than the local usefulness (e.g., with a lower α value). Consideration when setting α manually include "is it better to offload MSs 350 in the application, if other devices can onboard them" (by setting (e.g., manually setting) α to a low value) or "is it preferable to execute the application locally" (by setting (e.g., manually setting) α to a high value).

It is this significance of the local and remote usefulness of a pattern that is adjusted by weight α, as described herein above. The weight α may be further optimized dynamically at runtime, using AI/ML learning techniques, exploiting various trade-offs in application decomposition and offloading (e.g., the trade-offs between modularization (penalty) and (performance gain through) offloading).

The available resources that belong to the above categories can be searched and added to a list by detecting available device resources at runtime (e.g., by iterating through device files on Unix-like OSs), or through static configuration files distributed by the vendor. If such list D with L number of discovered resources, and I (I(x)) containing all profiler information and API invocation (N number of) information (source code) of MS x exists (a node in the clustered DAG), usefulness(x) assigns the usefulness value of x, as below. The following representative pseudo code illustrates such a search:

| Representative Pseudo Code for Algorithm 1 |
| --- |
| 1.  Initialize useful = 0, i = 1, 2, ..., N, j = 1, 2, ..., L |
| 2.  Obtain D through detection & config files |
| 3.  Obtain I through clustering |
| 4.  for each $y_i$ in I, |
| 5.    for each $t_j$ in D |
| 6.      if $y_i$ of type $t_j$ |
| 7.        useful = 1 |
| 8.      end if |
| 9.    end for |
| 10. end for |
| 11. Return useful |

In certain embodiments, the decision value ('useful') of each 350 is indicated as '1', if onboarding, and '0' otherwise. In other embodiments, AI/ML techniques may be used for assigning local usefulness values using other parameters than just instruction usage, e.g., assigning higher values for MS patterns that may be known/proven to perform better than the others, and exploring for new MS patterns that performs better. The MS pattern usefulness may be subject to various constraints, for example as set forth as follows:

$\forall x \in S$: usefulness$(x) > 0$      characteristic 1)

$\exists ! x \in S$: usefulness$(x) > 0$      characteristic 2)

$\exists ! x \in S$: usefulness$(x) = 0$      characteristic 3)

$|S| = min\{|S_1|, \ldots, |S_k|\}$      characteristic 4)

where K is the total number of MS patterns provided by the MCE 230.

Depending on the device optimization/offloading strategy used, the last constraint (e.g., constraint 4 (e.g., selecting the MS pattern with a minimum number of nodes) may be combined with any of other constraints described above) For example, choosing the smallest MS pattern that offloads at least one MS (based on constraint 2 and constraint 4) may be implemented.

The following operations demonstrate how the procedures can be put to practice, as one example.

| 1. | Initialize i = 1, 2, ..., K |
| --- | --- |
| 2. | Obtain list Y of DAGs through PS pattern generation from information gathered by profiling. |
| 3. | Update Y through clustering |
| 4. | Obtain $C_i$ from configuration files |
| 5. | for each $S_i$ in Y, |
| 6. |    Calculate $u_{local}$ according to Equation 4 and Algorithm 1 |
| 7. |    Calculate $u_{remote}$ according to Equation 3 |
| 8. |    Calculate $u_{total}$ according to Equation 2 |
| 9. | end for |
| 10. | Update Y by ordering patterns according to their $u_{total}$ values. |
| 11. | Update Y such that all MSs satisfy Constraint 2. |
| 12. | Update Y by choosing patterns that satisfy $u_{local} > C_i$ |
| 13. | Generate MS identifiers, per each MS in all patterns in Y, and, if utilizing remote storage, Upload them with their corresponding values calculated by usefulness( ) in operation 6 by the Algorithm 1 to the distributed storage as name-value pairs. |
| 14. | Generate MS pattern identifiers per each pattern in Y and, if utilizing remote storage, Upload them with their corresponding $u_{local}$ values calculated in operation 6 to the distributed storage as name-value pairs. |
| 15. | Provide Y as input to the Partitioner 240 (e.g., Partitioner module) for realizing the chosen set of MS patterns. |

Representative Use Case

The user may install a prepackaged video viewing app that takes a video source as a URL, and displays the streamed remote content on user display. The application 330 may involve multiple app tasks, specifically 'request' video chunks, 'decode' and 'extract' video frames. The extracted frames may get 'written' into a 'framebuffer' and then the screen may get 'refreshed'. Since the application is packaged as a single, monolithic application, the execution of those tasks may be limited to the device on which the application has been installed and is being executed at any point in time.

The representative use case illustrates how the application is decomposed over time into MSs 350-1 and 350-2 with the possibility to execute those MSs 350-2 on other devices 320 with the same decomposition occurring over time. For this, a decomposer component may be implemented, as disclosed herein, to run on the device where the application is being installed and executed.

As a result of the decomposer component executing, as disclosed herein, the video app is being decomposed over time into MSs 350-1 and 350-2 that may be distributed, e.g., the app tasks that receive extracted frames from the received video and display on the local screen, may be offloaded, for instance, to a better nearby display, after decomposition into a MS 350. Among app components that receive the video stream and display on the local screen, there may be other frame processing components that perform various processing tasks on the video frames, (e.g., 'resizing' and 'applying effects' on frames, among others). A user may download and may install the app using one pre-packaged file (e.g., apk), as one executable, with all above components in one monolithic application.

FIG. 6 is a diagram illustrating a representative DAG.

Referring to FIG. 6, the profiler 210 may acquire application runtime information and generate a DAG 600 including, for example with function calls associated with any of: a Request function call 610, a Decode function call 620, an Extract function call 630, a Resize function call 640, a Appfilter function call 650, a Write function call 660, a Frame Buffer function call 670, and/or a Refresh function call 680.

FIG. 7 is a diagram illustrating a representative type hierarchy of an ontology.

Referring to FIG. 7, the MS cluster engine (MCE) 230 may utilize an ontology 700 with a hierarchy (a multi-level hierarchy) with any number of lower level nodes. For example, the highest level of the ontology hierarchy may include a "Type" node 710. The second level nodes (e.g., at the next level below) may include an "Action" node 720, a "Resource" node 730, and/or a "State Access" node 740. The third level nodes (the lowest level nodes) associated with the "Action" node 720 may include a "Receive" node 750, a "Process" node 760 and/or a "Display" node 770. The third level nodes (the lowest level nodes) associated with the "Resource" node 730 may include a "Network" node 780, a "Graphics" node 790 and/or a "Presentation" node 795.

Although FIG. 7 shows a three level ontology, any number of levels is possible. Although FIG. 7 shows three corresponding lower level nodes per higher level node, any number of corresponding lower level nodes is possible.

FIG. 8 is a diagram illustrating a representative clustered MS pattern as an output of the MCE.

Referring to FIG. 8, for the clustered MS pattern 800, the MCE 230 may cluster the PSs of FIG. 6 into MSs 350. For example. The MSs 350 may include a Receive MS pattern 810, a Process MS pattern 820 and/or a Display MS pattern 830. The Receive MS pattern 810 may include, for example, a Request MS 840, a Decode MS 850 and/or an Extract MS 860. The Process MS pattern 820 may include a Resize MS 870 and/or an AppFilter MS 875. The Display MS pattern 830 may include a Write MS 880, a Frame Buffer MS 885 and/or a Refresh MS 890. Other MS patterns and MS are possible to enable various function calls.

A description of how the operation that lead to a decomposition result, utilizing Operations 1, 2a, 2b, 3, 4 and 6 in relation to FIG. 2 is set forth below.

Operation 1

The Profiler 210 may acquire application runtime information. The application runtime information may include function invocations, system instruction usage, resource usage and/or structural information (e.g., internal class and packaging structure) of the application.

Operation 2a

The PS generator may receive the executable code with the collected application information from the Profiler 210. Based on the highlighted function callers, callees, and the information flow between them, the DAG (as shown in FIG. 6) may be generated with the following form, e.g., the function calls associated with any of: a Request function call 610, a Decode function call 620, an Extract function call 630, a Resize function call 640, a Appfilter function call 650, a Write function call 660, a Frame Buffer function call 670, and/or a Refresh function call 680. In this case, there is only one PS pattern created, but other PS patterns are possible.

Operation 2b

The MS cluster engine (MCE) 230 may utilize an ontology with the following type hierarchy (as shown in FIG. 7) to cluster PSs into larger MSs. The operation associated with the MCE 230 disclosed herein may be executed on the received PS pattern, obtaining the MS pattern shown in FIG. 8. The caption of each larger circle may indicate the resulting app functions as MSs. In the example, the decomposer may identify one MS pattern with receive, process, and display MSs that perform network tasks (based on the Action type of the ontology in FIG. 7), frame processing tasks, and frame displaying tasks, respectively. Moreover, the 'write', 'refresh' and 'framebuffer' components may be clustered together due to their high state dependency, as reflected by the State Access type of the ontology. The result illustrated is influenced by both the types, their properties as well as the values attached to them.

The Partitioner 240 may realize the MSs, according to the received MS pattern from the MCE 230. For this, the executable code, obtained from the Profiler 210 in Operation 1, may be combined according to the execution boundaries defined by the MSs in FIG. 8, and dynamically loaded through JavaLoader classes, as separate MSs.

Operation 3

Operation 3 may determine which MSs are being executed locally (and which MSs are being executed remote MSs (e.g., not being executed locally). For this, procedures may use the DP entity disclosed herein. In a MWC demo, decisions were realized through dedicated user actions where local MS instances were terminated (or re-initiated) through explicit user interface elements as part of the application.

Operation 4

Operation 4 may manage the chaining of MS instances either through IPC (inter-process communication) or HTTP, while procedures disclosed in U.S. Patent Publication No. US2018/0007116 may be used to send those HTTP-based chaining requests via an information-centric network (ICN), leading to very fast indirection times of service requests in light of rapidly changing availability of MSs in the distributed environment. In certain representative embodiments, using the locality information of the MSs (e.g., received from the LMM 250), requests that are sent to the MSs that are executing device-locally may be indirected to the corresponding MS over IPC. If the requested MS is not executed locally on device, the requests may be sent over HTTP to the peering MS, in the distributed environment.

Operation 5

Operation 5 enables the execution of MSs on corresponding peer devices where the same MS pattern has been found (e.g., while local MSs are being executed on the primary device).

In certain representative embodiments, the 230 (e.g., MCE component) may be implemented as a separate system component.

In certain representative embodiments, the MS patterns may be stored alongside application process information.

In certain representative embodiments, communication with the remote storage, for sharing profiling and usefulness information may be implemented.

In certain representative embodiments, procedure may be implemented to enable dedicated IPC or HTTP calls based on profile information according to runtime behavior of the previously monolithic application.

Figure 9:
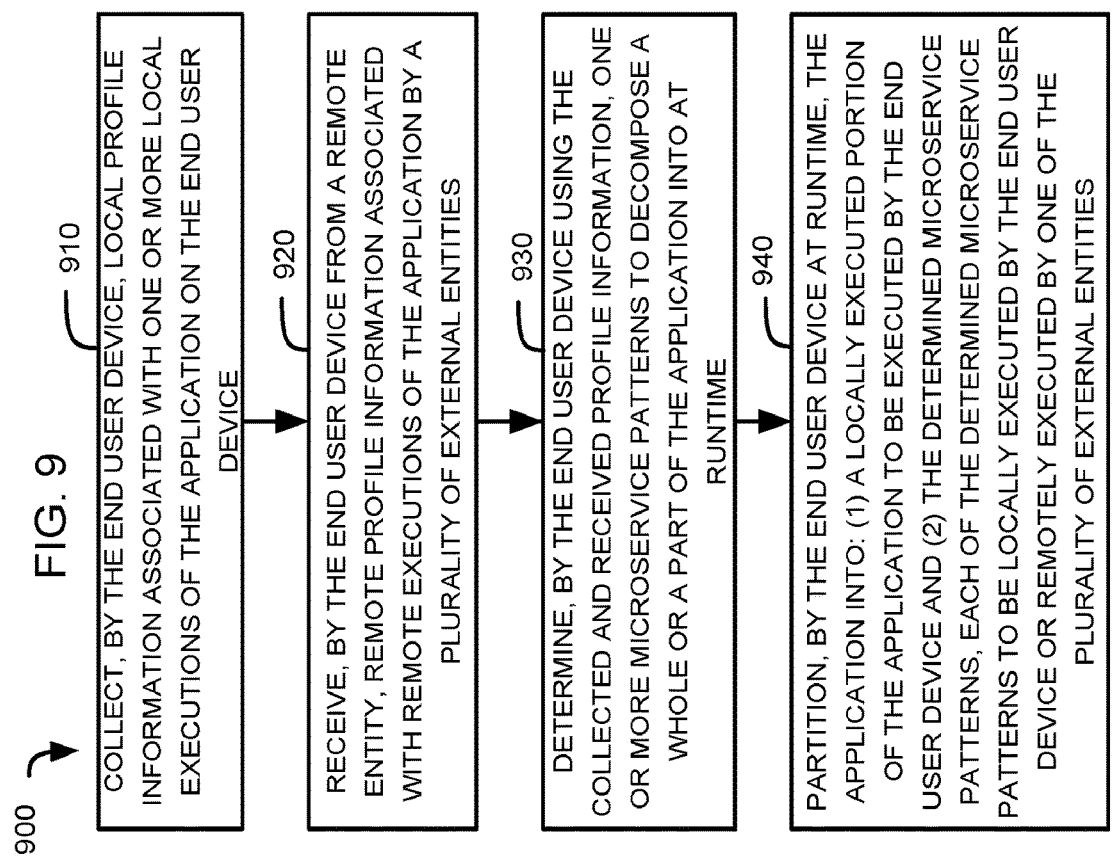
FIG. 9 is a flowchart illustrating a representative method to decompose an application (e.g., at runtime)

FIG. 9 is a flowchart illustrating a representative method implemented by an end user device (EUD) 310 (e.g., WTRU 102) to decompose an application (e.g., at runtime).

Referring the FIG. 9, the representative method 900 may include, at block 910, the EUD/WTRU 310/102 or any other device for execution of an application collecting local profile information associated with one or more local executions of the application on the EUD/WTRU 310/102. At block 920, the EUD/WTRU 310/102 may receive, from a remote entity 380, remote profile information associated with remote executions of the application by a plurality of external entities 320/102. At block 930 the EUD/WTRU 310/102 may determine, using the collected and received profile information, one or more microservice patterns to decompose a whole or a part of the application into at runtime. At block 940 the EUD/WTRU 310/102 may partition, at runtime, the application into: (1) a locally executed portion of the application to be executed by the EUD/WTRU 310/102 and (2) the determined microservice patterns. For example, each of the determined microservice patterns may be locally executed by the EUD/WTRU 310/102 or remotely executed by one of the plurality of external entities 320/102. For example, the external entity 320/102 may be another device and/or a network entity/function, among others.

In certain representative embodiments, the partitioning may include: altering a portion of application code, as microservice-altered application code, associated with the determined microservice patterns to enable execution by at least one of the external entities 320/102.

In certain representative embodiments, the EUD/WTRU 310/102 may execute: (1) the locally executed portion of the application and (2) the microservice-altered application code associated with each of the determined microservice patterns to be locally executed and/or may send microservice-altered application code associated with each of the determined microservice patterns to be remotely executed (e.g., to the microservice provider and/or an external entity 310/102).

In certain representative embodiments, the EUD/WTRU 310/102 may send, using an internal interface 360 (e.g., the PCI or other interface), the microservice-altered application code associated with each of the determined microservice patterns to be locally executed by a local instance.

In certain representative embodiments, the EUD/WTRU 310/102 may send the microservice-altered application code associated with each of the determined microservice patterns to be remotely executed via an external interface 370.

In certain representative embodiments, the remote profile information may include partition information indicating execution borders used by one or more of the plurality of external entities 320/102 to partition the application.

In certain representative embodiments, the determination of the one or more microservice patterns to decompose the application into at runtime may include selection of the one or more microservice pattern for decomposition based on at least the local profile information and the partition information.

In certain representative embodiments, for each respective determined microservice pattern, the EUD/WTRU 310/102 may select among: the EUD/WTRU 102 and any of the plurality of external entities 320/102 for execution of microservice-altered application code associated with the respective determined microservice pattern based on the collected and received profile information. For example, on condition that a first microservice-altered application code is selected to be executed by the EUD/WTRU 310/102, the EUD/WTRU 310/102 may manage the execution of the first microservice-altered application code on the EUD/WTRU 310/102. As another example, on condition that the first microservice-altered application code is selected to be executed by a first external entity, the EUD/WTRU 310/102 may manage an interface with the first external entity to execute of the first microservice-altered application code on the first external entity.

In certain representative embodiments, the remote profile information may include any of: (1) information associated with onboarding capabilities for execution of microservice-altered application code associated with the microservice patterns; or (2) a total usefulness value for each respective microservice pattern associated with the importance and/or priority of the respective microservice pattern.

In certain representative embodiments, the determination of one or more microservice patterns may include detection of one or more execution boundaries of the application in accordance with the collected profile information and the received remote profile information.

In certain representative embodiments, the EUD/WTRU 310/102 may cluster a first set of picoservices into a first microservice pattern and a second set of picoservices into a second microservice pattern according to an ontology.

In certain representative embodiments, the partitioning of the application may include partitioning, at runtime, the first and second microservice patterns using one or more wrapper classes.

In certain representative embodiments, the EUD/WTRU 310/102 may send to another entity 320/102 the collected profile information regarding the local executions of the application on the EUD/WTRU 310/102.

In certain representative embodiments, the EUD/WTRU 310/102 may communicate with the first external entity 320/102 between the locally executed portion of the partitioned application and a respective microservice associated with the first microservice pattern executing on the first external entity 320/102 using a wrapper class and HTTP protocol.

In certain representative embodiments, the clustering of the first set of picoservices into the first microservice pattern may include: (1) receiving, for example by a MCE 230, information associated with the first set of picoservices; and/or (2) clustering the first set of picoservices into the first and second microservice patterns in accordance with a hierarchically-based ontology.

In certain representative embodiments, the EUD/WTRU 310/102 may determine a usefulness value for each of the first and second microservice patterns, the EUD/WTRU 310/102 may select at least the first microservice pattern based on the determined usefulness value of the first microservice pattern, and/or the EUD/WTRU 310/102 may present the selected microservice pattern for partitioning.

In certain representative embodiments, the selecting of the first microservice pattern may include selecting the first microservice pattern on condition that the determined usefulness value for the first microservice pattern is above a threshold.

In certain representative embodiments, the EUD/WTRU 310/102 may detect execution boundaries of the application. The EUD/WTRU 310/102 may define the one or more microservice patterns around or in accordance with the detected execution boundaries.

In certain representative embodiments, the EUD/WTRU 310/102 may alter the application by adding wrapper classes around one or more microservices identified in the one or more microservice patterns (e.g., application code with identified execution boundaries) and/or may manage the execution of one or more identified microservices on a subset of the plurality of external entities 320/102.

In certain representative embodiments, the EUD/WTRU 310/102 may generate from the profile information one or more directed acyclic graphs and may determine one or more microservice patterns using the one or more directed acyclic graphs.

In certain representative embodiments, the partitioning of the application may include: selection of execution/partitioning boundaries associated with one or more microservice patterns based on the collected and received profile information and offloading rules.

In certain representative embodiments, the EUD/WTRU 310/102 may select from among: the EUD 310/102, a first external entity 320/102 or a second external entity 320/102 for execution, as a selected entity for a determined first microservice pattern. The EUD/WTRU 310/102 may select from among: the EUD 310/102, a first external entity 320/102 or a second external entity 320/102 for execution, as a selected entity for a determined second microservice. For example, the EUD/WTRU 310/102 may manage the execution of microservice-altered application code associated with the determined first microservice pattern on the selected entity for the determined first microservice pattern; and may manage the execution of microservice-altered application code associated with the determined second microservice pattern on the selected entity for the determined second microservice pattern.

Figure 10:
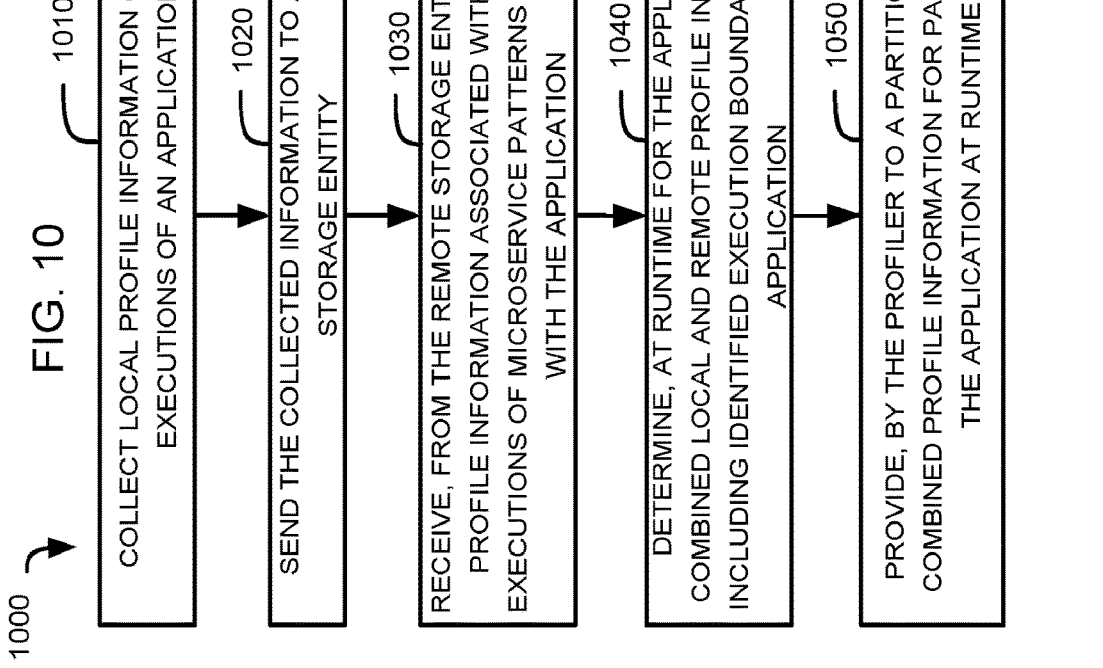
FIG. 10 is a flowchart illustrating a representative method implemented by a profiler.

FIG. 10 is a flowchart illustrating a representative method implemented by a profiler 210.

Referring the FIG. 10, the representative method 1000 may include, at block 1010, the profiler 210 collecting local profile information of local executions of an application 330. At block 1020, the profiler 210 may send the collected information to a remote storage entity (any remote EUD, remote WTRU or network entity. At block 1030, the profiler 210 may receive, from the remote storage entity, remote profile information associated with remote executions of microservice patterns associated with the application 330. At block 1040, the profiler 210 may determine, at runtime for the application 330, combined local and remote profile information including identified execution boundaries of the application. At block 1050, the profiler 210 may provide to a partitioner 240, the combined profile information for partitioning the application 330 at runtime. For example, the determining of the combined local and remote profile information may include determining to combine the local and remote profile information based on any of: (1) a usefulness of the local profile information; (2) a usefulness of the remote profile information; or (3) a priority or a relative priority of the remote profile information.

FIG. 11 is a flowchart illustrating a representative method implemented by a centralized database or a network entity.

Referring the FIG. 11, the representative method 1100 may include, at block 1110, the centralized database/network entity (CD/NE) 380 receiving, from a plurality of EUDs 310/320/102, profile information associated with remote executions of microservice patterns associated with an application and including (1) an identifiers of each respective EUD 310/320/102 and onboarding capability information indicating onboarding capabilities of each respective EUD 310/320/102. At 1120, the CN/NE 360 may receive from a requesting EUD 310/320/102, a request for one or more microservices associated with an application 330. At 1130, the CN/NE 360 may determine from the request, the profile information associated with one or more microservices. At 1140, the CN/NE 360 may send to the requesting EUD 310/320/102, a response including the determined profile information associated with the one or more microservices. In certain examples, the remote profile information may include information including one or more identifiers of microservices associated with the microservice patterns for remote executions.

FIG. 12 is a flowchart illustrating a representative method implemented by a PSPG 220.

Referring the FIG. 12, the representative method 1200 may include, at block 1210, receiving profile information pertaining to an application 330 to be executed on an EUD 310/320/102 that identifies execution/partitioning boundaries. At block 1220, the PSPG may generate, at runtime for the application, picoservice patterns along the identified execution/partitioning boundaries for the application 330. At block 1230, the PSPG may provide the generated picoservice patterns for clustering into microservice patterns.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM") or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented by an end user device to decompose an application, the method comprising:
   collecting local profile information associated with one or more local executions of the application by the end user device;
   receiving, from a remote entity, remote profile information associated with remote executions of the application by at least one external entity;
   determining, using the collected local profile information and the received remote profile information, one or more microservice patterns to decompose a whole or a part of the application into at runtime; and
   partitioning, at runtime, the application into: (1) a local execution portion of the application to be executed by the end user device and (2) the determined one or more microservice patterns, each of the determined one or more microservice patterns to be locally executed by the end user device or to be remotely executed by the at least one external entity that is in communication with the end user device,
   wherein:
      the received remote profile information includes partition information indicating execution borders used by the at least one external entity to partition the application, and
      the determining of the one or more microservice patterns includes selecting the one or more microservice patterns for decomposition based on at least the collected local profile information and the partition information included in the received remote profile information.

2. The method of claim 1, wherein the partitioning includes altering a portion of application code, as microservice-altered application code, associated with the determined one or more microservice patterns.

3. The method of claim 2, further comprising:
   sending, by the end user device, a first portion of the microservice-altered application code for remote execution by the at least one external entity; and
   executing, by the end user device: (1) the local execution portion of the application and (2) a second, separate portion of the microservice-altered application code.

4. The method of claim 3, further comprising sending, using an internal interface, the second, separate portion of the microservice-altered application code to be locally executed by a local instance,
   wherein the sending of the first portion of the microservice-altered application code for remote execution includes sending, via an external interface, the first portion of the microservice-altered application code to the at least one external entity.

5. The method of claim 1, further comprising:
   for each respective determined microservice pattern, selecting from among: the end user device and any of the at least one external entity for execution of microservice-altered application code associated with the respective determined microservice pattern based on the collected local profile information and the partition information included in the received remote profile information; and
   on condition that a first microservice-altered application code is selected to be executed by the end user device, managing a local execution of the first microservice-altered application code by the end user device.

6. The method of claim 1, further comprising:
   for each respective determined microservice pattern, selecting from among: the end user device and any of the at least one external entity for execution of microservice-altered application code associated with the respective determined microservice pattern based on the collected local profile information and the partition information included in the received remote profile information; and
   on condition that a first microservice-altered application code is selected to be executed by a first external entity, managing an interface to the first external entity to execute the first microservice-altered application code by the first external entity.

7. The method of claim 1, further comprising:
   clustering a first set of picoservices into a first microservice pattern and a second set of picoservices into a second microservice pattern according to an ontology having a type hierarchy.

8. The method of claim 7, wherein the clustering of the second set of picoservices into the second microservice pattern includes:
   receiving, by a Microservice Cluster Engine (MCE), information associated with at least the second set of picoservices to determine the type hierarchy for the ontology; and
   clustering the second set of picoservices into the second microservice pattern in accordance with the determined type hierarchy for the ontology.

9. The method of claim 1, further comprising:
   selecting from among: the end user device, a first external entity or a second external entity, as a first selected entity, for first execution of microservice-altered application code associated with a determined first microservice pattern;
   selecting from among: the end user device, the first external entity or the second external entity, as a second selected entity, for second execution of microservice-altered application code associated with a determined second microservice pattern;
   managing the first execution of the microservice-altered application code associated with the determined first microservice pattern by the first selected entity; and
   managing the second execution of the microservice-altered application code associated with the determined second microservice pattern by the second selected entity.

10. An end user device configured to decompose an application, the end user device comprising:

circuitry, including any of a processor, memory, and transceiver, configured to collect local profile information associated with one or more local executions of the application by the end user device;

receive, from a remote entity, remote profile information associated with remote executions of the application by at least one external entity;

determine, using the collected local profile information and received remote profile information, one or more microservice patterns to decompose a whole or a part of the application into at runtime; and partition, at runtime, the application into: (1) a local execution portion of the application to be executed by the end user device and (2) the determined one or more microservice patterns, each of the determined one or more microservice patterns to be locally executed by the end user device or remotely executed by the at least one external entity that is in communication with the end user device, wherein:

the remote profile information includes partition information indicating execution borders used by the at least one external entity to partition the application, and the processor is configured to select the one or more microservice patterns for decomposition based on at least the collected local profile information and the partition information included in the received remote profile information.

11. The end user device of claim 10, wherein the processor is configured to alter a portion of application code, as microservice-altered application code, associated with the determined one or more microservice patterns.

12. The end user device of claim 11, configured to send a first portion of the microservice-altered application code for remote execution by the at least one external entity, wherein the processor is configured to execute: (1) the local execution portion of the application and (2) a second, separate portion of the microservice-altered application code.

13. The end user device of claim 12, further comprising an internal interface configured to send the second, separate portion of the microservice-altered application code to be locally executed by a local instance, wherein the transceiver is configured to send, via an external interface to the at least one external entity, the first portion of the microservice-altered application code.

14. The end user device of claim 10, wherein the processor is configured to:

for each respective determined microservice pattern, select from among: the end user device and any of the at least one external entity for execution of microservice-altered application code associated with the respective determined microservice pattern based on the collected local profile information and the partition information included in the received remote profile information; and on condition that a first microservice-altered application code is selected to be executed by the end user device, manage a local execution of the first microservice-altered application code by the end user device.

15. The end user device of claim 10, wherein the processor is configured to:

for each respective determined microservice pattern, select from among: the end user device and any of the at least one external entity for execution of microservice-altered application code associated with the respective determined microservice pattern based on the collected and received partition information; and on condition that a first microservice-altered application code is selected to be executed by a first external entity, manage an interface to the first external entity to execute of the first microservice-altered application code by the first external entity.

16. The end user device of method of claim 10, wherein the processor is configured to cluster a first set of picoservices into a first microservice pattern and a second set of picoservices into a second microservice pattern according to an ontology having a type hierarchy.

17. The end user device of claim 10, wherein the processor is configured to:

select from among: the end user device, a first external entity or a second external entity, as a first selected entity, for first execution of microservice-altered application code associated with a determined first microservice pattern;

select from among: the end user device, the first external entity or the second external entity, as a second selected entity, for second execution of microservice-altered application code associated with a determined second microservice pattern;

manage the first execution of the microservice-altered application code associated with the determined first microservice pattern by the first selected entity; and manage the second execution of the microservice-altered application code associated with the determined second microservice pattern by the second selected entity.

* * * * *